United States Patent
Saitoh et al.

(10) Patent No.: US 11,533,403 B2
(45) Date of Patent: Dec. 20, 2022

(54) PROCESS EXECUTING SYSTEM, INFORMATION PROCESSING SYSTEM, INFORMATION PROCESSING METHOD, AND RECORDING MEDIUM FOR DETECTING DUPLICATE IMAGE DATA FROM A SAME OUTPUT MATERIAL

(71) Applicants: Seiichi Saitoh, Kanagawa (JP); Ayako Tsushima, Kanagawa (JP); Kazuaki Kidoguchi, Saitama (JP); Atsuko Serizawa, Tokyo (JP); Tomoya Amikura, Tokyo (JP); Nobumitsu Tabei, Kanagawa (JP)

(72) Inventors: Seiichi Saitoh, Kanagawa (JP); Ayako Tsushima, Kanagawa (JP); Kazuaki Kidoguchi, Saitama (JP); Atsuko Serizawa, Tokyo (JP); Tomoya Amikura, Tokyo (JP); Nobumitsu Tabei, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/472,889

(22) Filed: Sep. 13, 2021

(65) Prior Publication Data

US 2022/0086287 A1 Mar. 17, 2022

(30) Foreign Application Priority Data

Sep. 16, 2020 (JP) .............................. JP2020-155739

(51) Int. Cl.
*H04N 1/00* (2006.01)
*H04N 1/64* (2006.01)

(52) U.S. Cl.
CPC ..... *H04N 1/00209* (2013.01); *H04N 1/00114* (2013.01); *H04N 1/00185* (2013.01);
(Continued)

(58) Field of Classification Search
None
See application file for complete search history.

(56) References Cited

U.S. PATENT DOCUMENTS

| 2015/0304520 A1* | 10/2015 | Nakamura | H04N 1/00411 358/403 |
| 2016/0094748 A1* | 3/2016 | Utoh | H04N 1/00915 358/1.13 |

(Continued)

FOREIGN PATENT DOCUMENTS

| JP | 2018-007085 | 1/2018 |
| JP | 2021-016147 | 2/2021 |

*Primary Examiner* — Henok Shiferaw
(74) *Attorney, Agent, or Firm* — IPUSA, PLLC

(57) ABSTRACT

A process executing system for receiving image data of an output material from an apparatus and processing the output material, the process executing system comprising a communicator and a duplicate detector. The communicator is configured to transmit, in response to a request from the apparatus, output data of the output material including identification information of the output material, and is configured to receive image data generated by reading the output material by the apparatus, the output material being the output data printed by the apparatus. The duplicate detector is configured to detect a generation of the image data from a same output material as the output material, based on the identification information of the output material attached in the image data received by the communicator.

9 Claims, 32 Drawing Sheets

(52) U.S. Cl.
CPC ....... *H04N 1/64* (2013.01); *H04N 2201/0029* (2013.01); *H04N 2201/0094* (2013.01)

(56) References Cited

U.S. PATENT DOCUMENTS

| | | | |
|---|---|---|---|
| 2016/0124690 A1* | 5/2016 | Kimura | G06F 3/1242 |
| | | | 358/1.15 |
| 2016/0212298 A1* | 7/2016 | Hama | G06V 10/235 |
| 2017/0013169 A1* | 1/2017 | Kim | H04N 1/00204 |
| 2018/0097965 A1* | 4/2018 | Hashizume | H04N 1/32192 |
| 2019/0050184 A1* | 2/2019 | Ozawa | G06F 3/1222 |
| 2020/0097162 A1* | 3/2020 | Hayashi | G06F 3/14 |
| 2021/0014371 A1 | 1/2021 | Utoh et al. | |
| 2021/0203792 A1* | 7/2021 | Kashihara | H04N 1/00962 |
| 2022/0075579 A1* | 3/2022 | Takahashi | G06F 3/1238 |

* cited by examiner

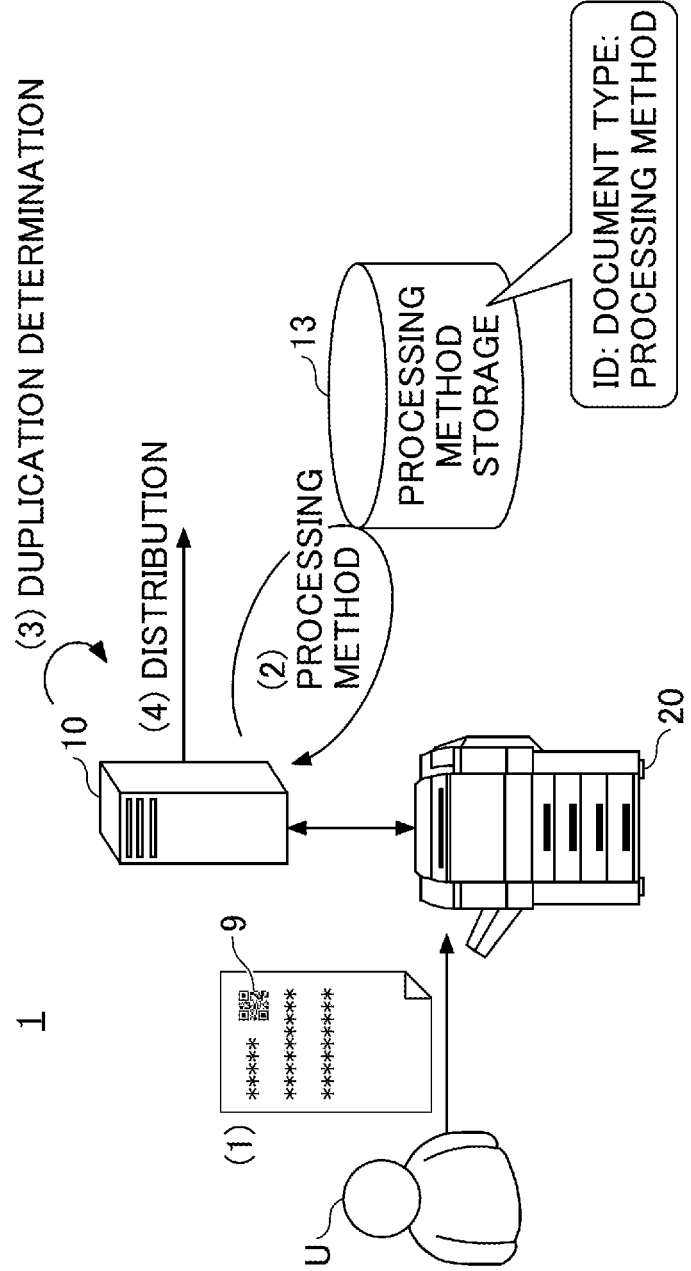

FIG.7

Smart Integration

BACK TO TOP / BACK TO APPLICATION MANAGEMENT

APPLICATION FORM PRINT SERVICE

* IS REQUIRED ITEM
STORAGE SETTING

STORAGE    Office 365 ~301

STORAGE ACCOUNT *    SELECT USER
                     USER IS NOT SELECTED ~302

PRINT DATA STORAGE
DESTINATION    SELECT FOLDER  FOLDER IS NOT SELECTED
               ~303
               ~304  [+] ~305

PROCESSING METHOD
STORAGE DESTINATION *   SELECT FOLDER  FOLDER IS NOT SELECTED
                        ~306  [+] ~307

OTHER SETTINGS

PRINT SETTING

IMAGE CODE
ATTACHING METHOD

⊛ EBINA DEVELOPMENT
  USER

※REGISTERED TRADEMARK: Office 365

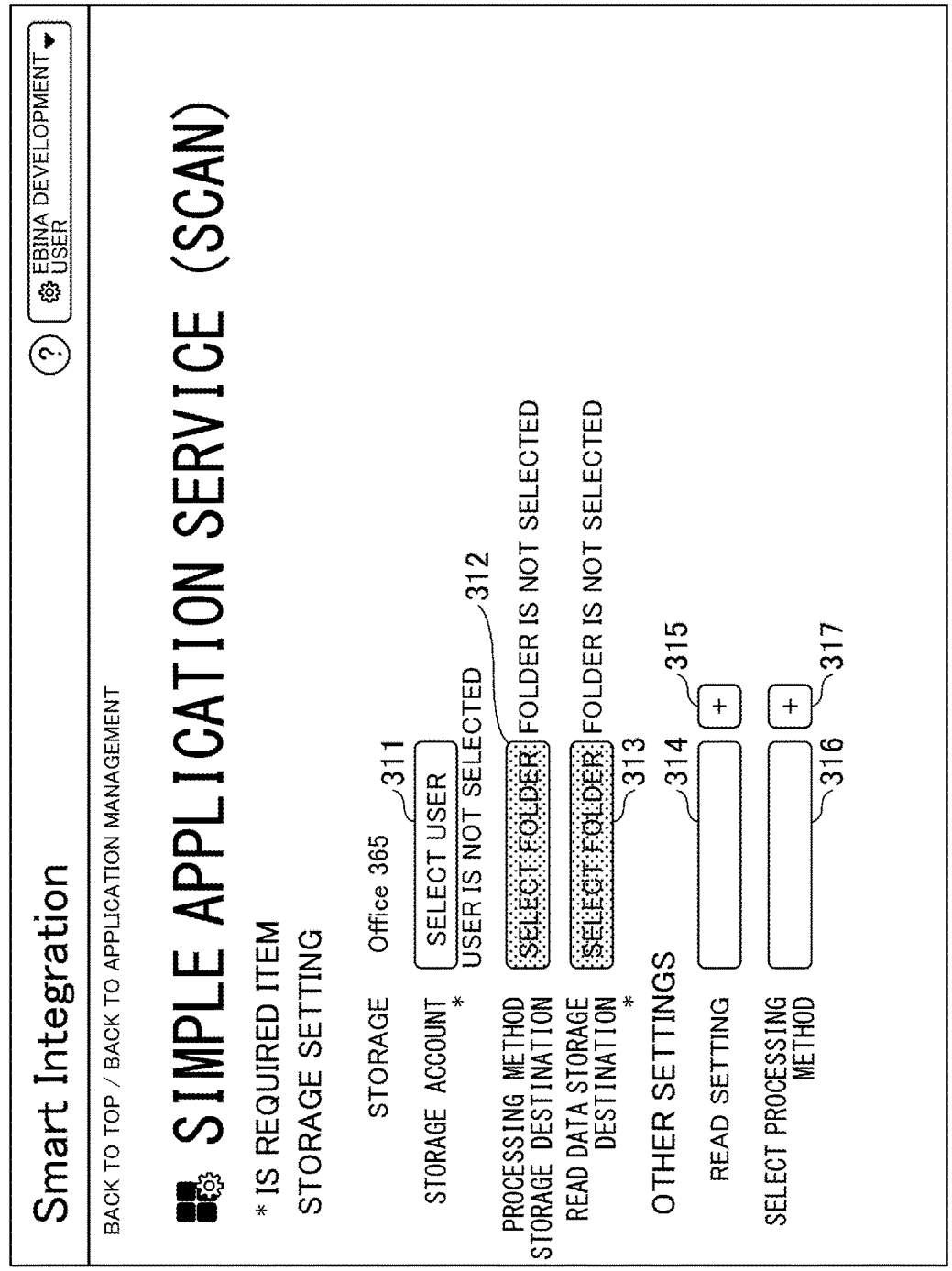

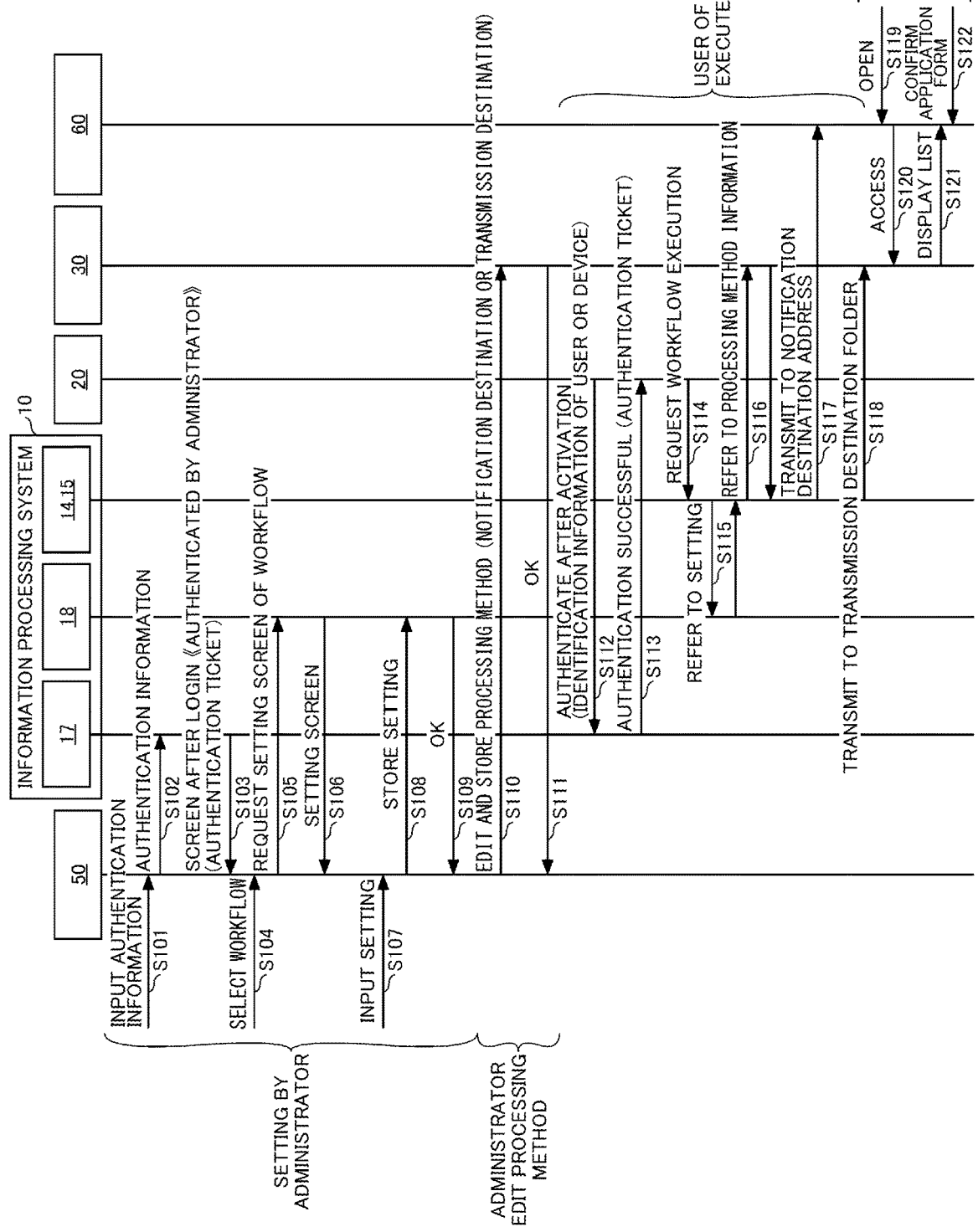

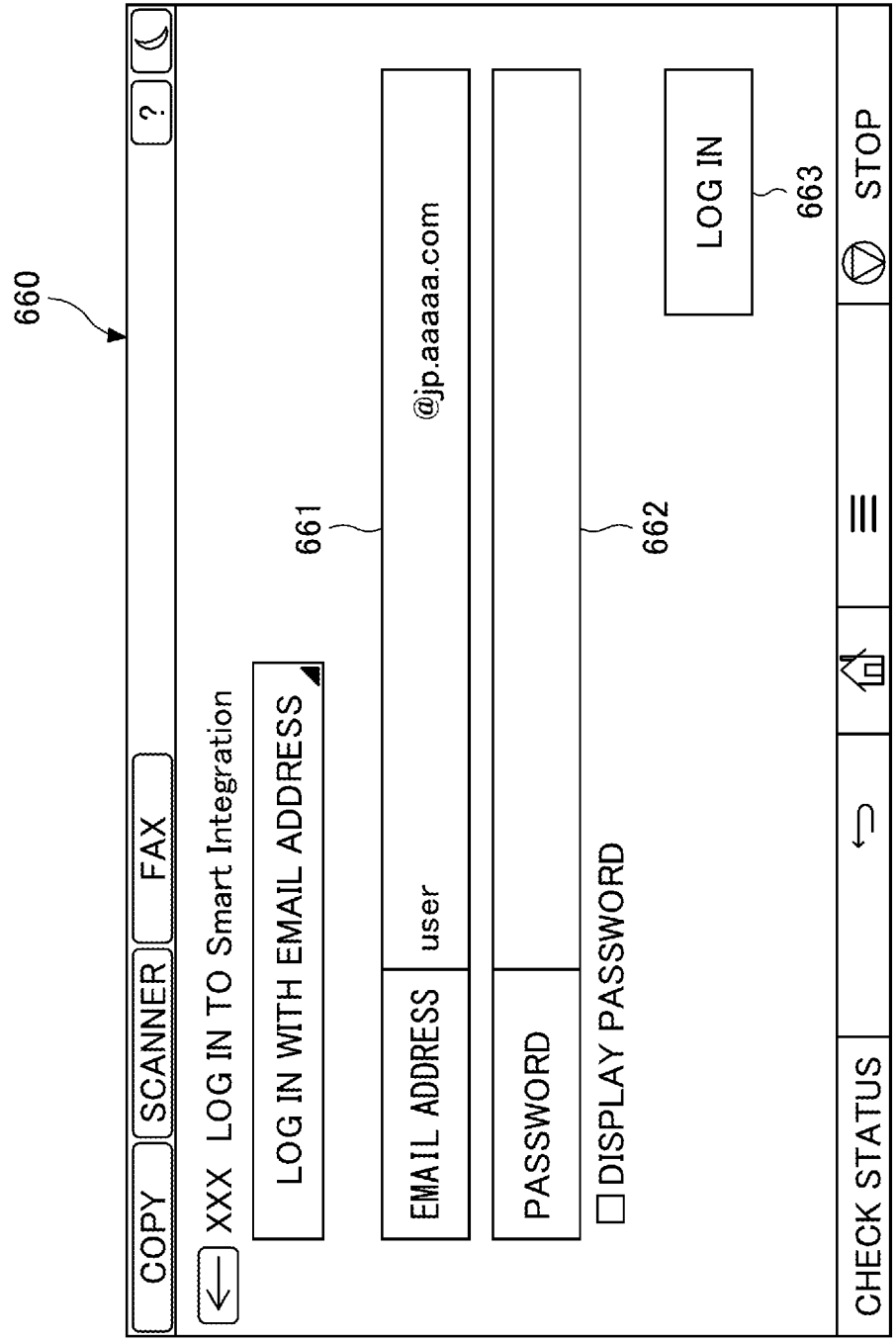

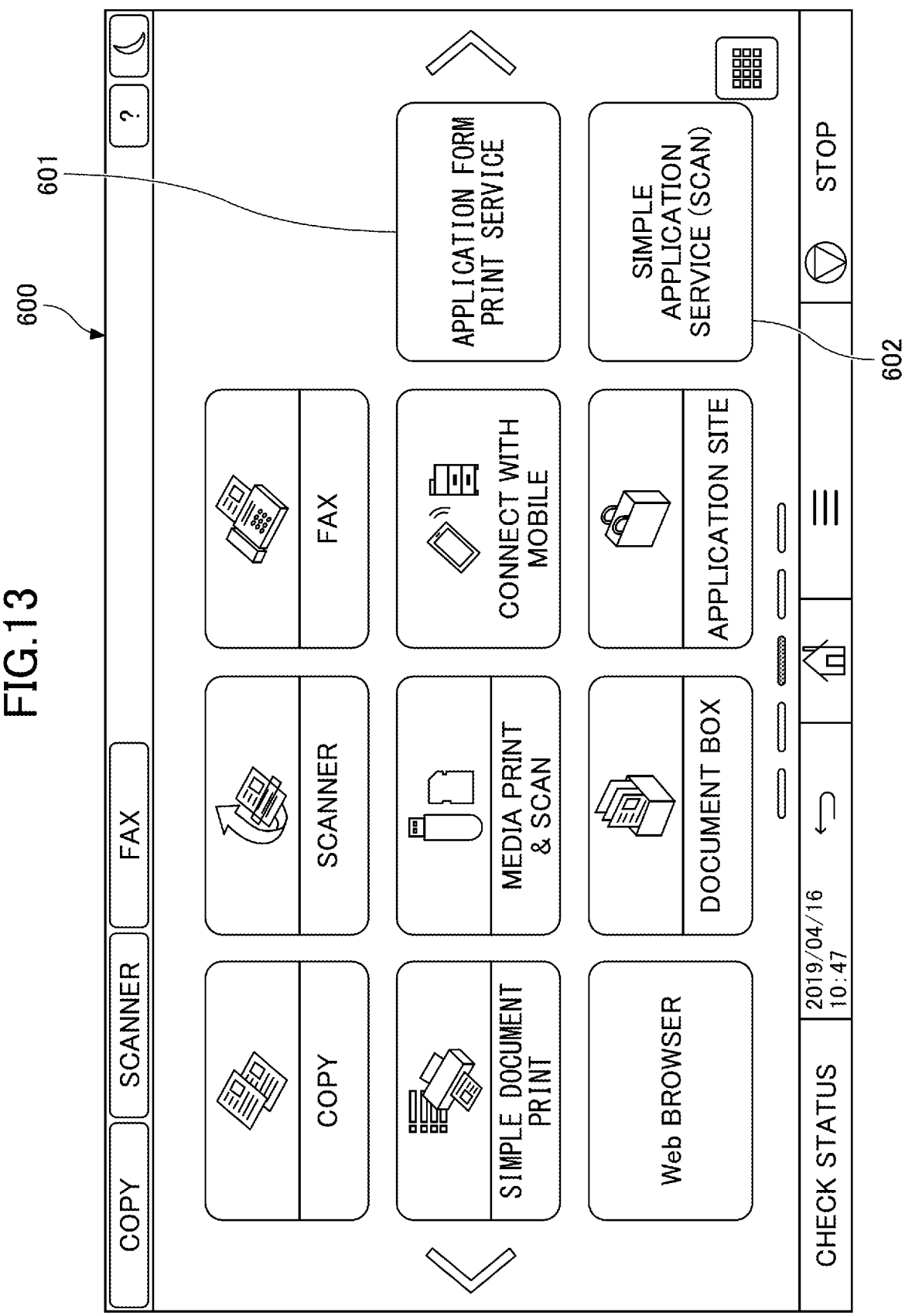

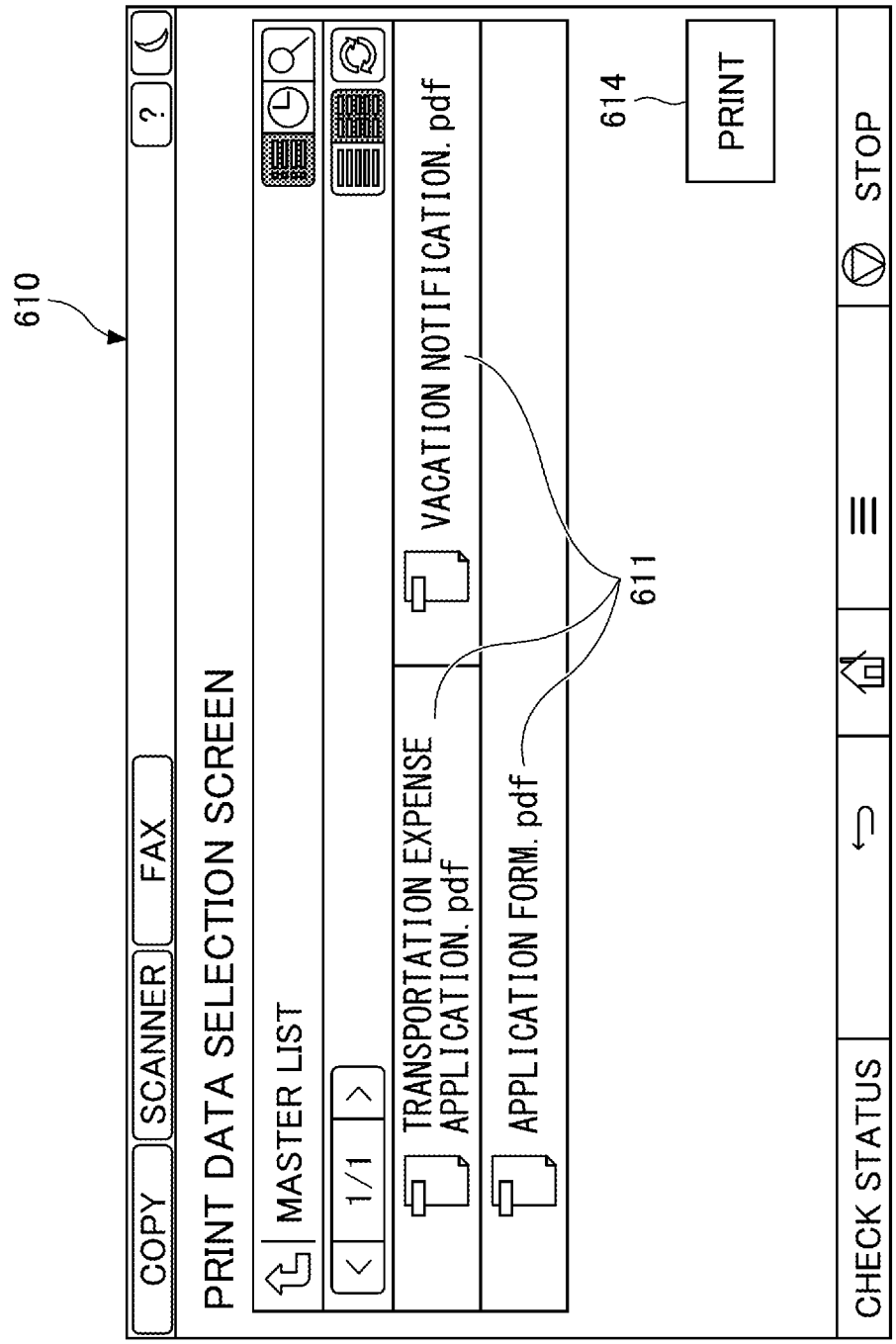

FIG.16

@EDW¥n:TRANSPORTATION EXPENSE APPLICATION.pdf:user0001:20200624091020

APPLICATION SETTING (ADMINISTRATOR)  ADMINISTRATOR MODE (on) ⓘ  👤 power user TENANT ID: 1084094133

( CANCEL )  ( SAVE )

↙ 670

↳ APPLICATION SETTING
PRINT APPLICATION FORM
* IS REQUIRED ITEM

| SELECT EXTERNAL SERVICE

EXTERNAL SERVICE*  [ EXTERNAL SYSTEM ]
☑ APPLY THIS SETTING TO ALL USERS ⓘ

SERVICE ACCOUNT*  [ SELECT USER ]

FORM FILE BASE FOLDER*  [ SELECT FOLDER ]

<u>OPEN AN EXTERNAL SERVICE LINK</u> ↗

┌─────────────────────────────────┐
│ | DEFAULT PARAMETER SETTING      │
│                                 │
│ 2D CODE PRINTING LOCATION*      │
│ [ UPPER LEFT ⌄ ]                │
└─────────────────────────────────┘
                    ↖ 671

| MANUAL

URL   https://manuals.ABC.com/edw-ds/ja/booklist/int/index_book.htm

| COMMON SETTING

FOLDER BROWSE DEFAULT SCREEN  [ LIST SCREEN ⌄ ]

FOLDER BROWSE DEFAULT LAYOUT  [ TWO-ROWS ⌄ ]

APPLICATION SETTING (ADMINISTRATOR)    ADMINISTRATOR MODE [on] ⓘ    ⊙ power_user TENANT ID: 1084094133

← APPLICATION SETTING
PRINT APPLICATION FORM
* IS REQUIRED ITEM (CANCEL)  (SAVE)

| SELECT EXTERNAL SERVICE

EXTERNAL SERVICE*    [EXTERNAL SYSTEM]
☑ APPLY THIS SETTING TO ALL USERS ⓘ

SERVICE ACCOUNT*    (SELECT USER)
SUBMISSION DESTINATION FOLDER*    (SELECT FOLDER)
OPEN AN EXTERNAL SERVICE LINK ⬈
SUBMISSION DESTINATION DEFINITION FILE*    (SELECT FILE)
OPEN AN EXTERNAL SERVICE LINK ⬈

| DEFAULT PARAMETER SETTING

BLANK REMOVAL*    [YES ⌄]

PROHIBIT DUPLICATE DOCUMENTS*    [NO ⌄]  ← 681

NOTIFY LOGGED-IN USER OF SUBMISSION COMPLETION*    [YES ⌄]

NOTIFICATION EMAIL ADDRESS IN CASE OF ERROR*    [○○○@co.jp]  [+]

| MANUAL

URL  https://manuals.ABC.com/edw-ds/ja/booklist/int/index_book.htm

FIG.20

(a) · PREVENTING DUPLICATED DOCUMENTS IS SET
{PREFIX}_{USER ID}_{PRINT DATE AND TIME}.pdf
　　　111　　　112　　　　　113

(b) · PREVENTING DUPLICATED DOCUMENTS IS NOT SET
{PREFIX}_{USER ID}_{SCAN DATE AND TIME}.pdf
　　　111　　　112　　　　　114

FIG.26

| ID | DOCUMENT TYPE | TRANSMISSION DESTINATION (FOLDER) | NOTIFICATION DESTINATION |
|---|---|---|---|
| paper_id_001 | INVOICE | UNDER /seikyuu FOLDER | aaa@bb.cc |
| paper_id_002 | TRANSPORTATION EXPENSE APPLICATION | UNDER /koutuu FOLDER | NONE |
| paper_id_003 | VACATION NOTIFICATION | UNDER /kyuuka FOLDER | ccc@bb.cc |

FIG.27

SUBMISSION DESTINATION DEFINITION FILE

| No. | DOCUMENT TYPE | TRANSMISSION DESTINATION (FOLDER) | FILE NAME | NOTIFICATION DESTINATION (MAIL ADDRESS) |
|---|---|---|---|---|
| (EXAMPLE) | CHANGE ADDRESS | CHANGE ADDRESS | RECEIVE_CHANGE ADDRESS | aaa@sample.com;bbb@sample.com |
| 1 | CHANGE ADDRESS.pdf | CHANGE ADDRESS | RECEIVE_CHANGE ADDRESS | john.smith@jp.ABC.com |
| 2 | CHANGE FAMILY MEMBER.pdf | CHANGE FAMILY MEMBER | RECEIVE_CHANGE FAMILY MEMBER | john.smith@jp.ABC.com; hans.schmidt@jp.ABC.com |
| 3 | TRANSPORTATION EXPENSE CALCULATION_●●DEPART.pdf | TRANSPORTATION EXPENSE | RECEIVE_ TRANSPORTATION EXPENSE | |
| 4 | TRANSPORTATION EXPENSE CALCULATION_□□DEPART.pdf | TRANSPORTATION EXPENSE | RECEIVE_ TRANSPORTATION EXPENSE | a1@bb.com;a2@bb.com;a3@bb.com; a4@bb.com;a5@bb.com |

FIG.28

| IDENTIFICATION INFORMATION OF OUTPUT MATERIAL (USER ID:yyyyMMddHHmmss) |
| --- |
| user0001:20200624091020 |
| user0001:20200624091021 |
| user0002:20200624091100 |
| user0009:20200624091200 |
| user0011:20200624091220 |
| …… |

FIG.29

| DOCUMENT TYPE | PREVENTING DUPLICATED APPLICATIONS |
| --- | --- |
| INVOICE | YES |
| TRANSPORTATION EXPENSE APPLICATION | YES |
| VACATION NOTIFICATION | NO |
| … | … |

PROCESS EXECUTING SYSTEM, INFORMATION PROCESSING SYSTEM, INFORMATION PROCESSING METHOD, AND RECORDING MEDIUM FOR DETECTING DUPLICATE IMAGE DATA FROM A SAME OUTPUT MATERIAL

CROSS-REFERENCE TO RELATED APPLICATIONS

The present application claims priority under 35 U.S.C. § 119 to Japanese Patent Application No. 2020-155739, filed on Sep. 16, 2020, the entire contents of which are incorporated herein by reference.

BACKGROUND OF THE INVENTION

1. Field of the Invention

The disclosures herein relate to a process executing system, an information processing system, an information processing method, and a recording medium.

2. Description of the Related Art

A process executing system is known that performs one or more processes and distributes image data input by a scanner function or a fax reception function of an apparatus. The process executing system may be called a workflow system because it sequentially performs a series of predetermined processes (workflow) on the image data.

A technique for automatically switching processes performed by the process executing system is known (for example, refer to Patent Document 1). Patent Document 1 discloses a system in which an image code is attached to a manuscript read by an apparatus. The image code of the read image data is analyzed, and processes are switched based on the analysis result.

However, in the related-art, it may be difficult to detect that the image data is generated from the same output material. For example, when an employee charges a company for expenses such as travel expenses, the employee prints out the output material of the travel expenses application form on the apparatus. The employee fills in the required items on the output material, reads the output material with the apparatus, and transmits generated image data to the information processing system. The information processing system transmits the image data to such as a predetermined folder, and a person in charge of general affairs acquires the image data from the folder and makes a payment. Therefore, if the employee reuses the output material used for the application form in the past to apply again, the application will be duplicated.

RELATED-ART DOCUMENTS

Patent Documents

Patent Document 1: Japanese Laid-Open Patent Application No. 2018-007085

SUMMARY OF THE INVENTION

In view of the above problems, an object of the present disclosure is to provide a process executing system capable of detecting that image data is generated from the same output material.

In view of the above problems, the present disclosure relates to a process executing system that receives image data of an output material from an apparatus and processes the output material. The process executing system includes one or more memories and one or more processing circuits coupled to the one or more memories and configured to function as a communicator and a duplication detector. The communicator is configured to transmit, in response to a request from the apparatus, to the apparatus, output data of the output material including identification information of the output material, and is configured to receive image data generated by reading the output material by the apparatus, the output material being the output data printed by the apparatus. The duplication detector is configured to detect a generation of the image data from a same output material as the output material, based on the identification information of the output material attached in the image data received by the communicator.

A process executing system can be provided capable of detecting that image data is generated from the same output material.

BRIEF DESCRIPTION OF THE DRAWINGS

Other objects and further features of the present invention will be apparent from the following detailed description when read in conjunction with the accompanying drawings, in which:

FIG. 1A and FIG. 1B are diagrams illustrating examples of an outline of an operation of a process executing system;

FIG. 7 is an example of a setting screen related to a print workflow;

FIG. 8 is an example of a setting screen related to a read workflow;

FIG. 9 is an example of a sequence diagram for describing the flow of a setting of the print workflow and the read workflow, execution of the read workflow, and a confirmation process of an application form;

FIG. 12A and FIG. 12B are diagrams illustrating examples of an authentication screen;

FIG. 13 is a diagram illustrating an example of a home screen;

FIG. 14A and FIG. 14B are diagrams illustrating examples of a print screen;

FIG. 16 is a diagram illustrating information included in an image code;

FIG. 18A and FIG. 18B are diagrams illustrating examples of a position setting screen displayed by a first terminal device being operated by an administrator;

FIG. 19 is a diagram illustrating an example of a duplicate document setting screen displayed by a first terminal device being operated by an administrator;

FIG. 20 is a diagram illustrating a file name given to image data by the information processing system;

FIG. 26 illustrates an example of processing method information stored in a processing method storage;

FIG. 27 illustrates an example of a file in which processing method information is described;

FIG. 28 illustrates an example of identification information of output material stored in an identification information of output material storage; and FIG. 29 illustrates an example of a duplicate detection setting information in which presence/absence of the setting for prohibiting duplicate documents being set by administrator is registered.

DESCRIPTION OF THE EMBODIMENTS

Hereinafter, as an example of an embodiment for implementing the present disclosure, a process executing system and information processing method implemented by the process executing system will be described with reference to the drawings.

<Outline of Operation>

Figure 1A:
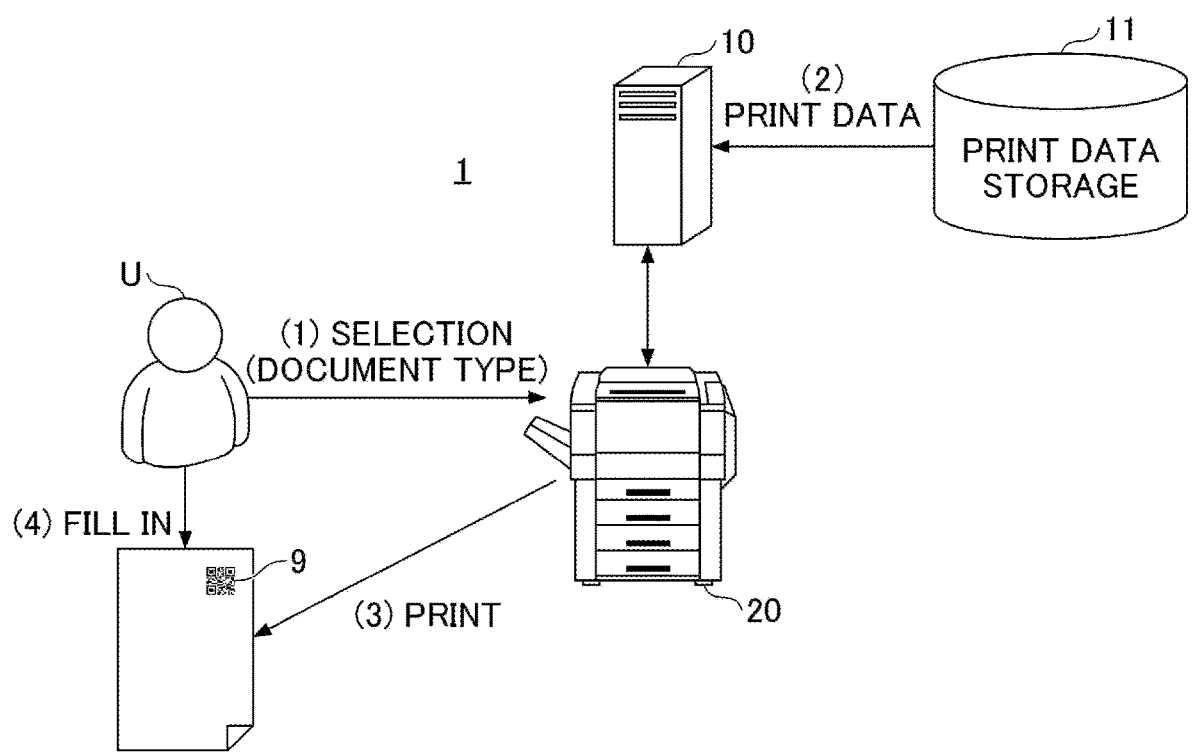

FIG. 1A and FIG. 1B are diagrams illustrating an outline of an operation of a process executing system 1. In the present embodiment, a print workflow and a read workflow are linked by the processing method information. Because the processing method information can be edited by an administrator, the workflow can be easily extended.

First, the print workflow will be described with reference to FIG. 1A.

(1) A user first selects the print workflow. As a result, an apparatus 20 displays a document type acquired by the information processing system 10 from a print data storage 11. The user selects the document type desired to be printed in the workflow. The apparatus 20 transmits the document type to the information processing system 10. The document type is information that identifies the document, such as a document name of various documents (for example, an application form).

(2) The information processing system 10 acquires a print data (output data) of the document indicated by the document type from the print data storage 11.

(3) The information processing system 10 converts identification information for identifying the document type and an output material (hereinafter, referred to as identification information of output material) into an image code 9 (for example, QR code (registered trademark)) to form the print data of the document, and transmits it to the apparatus 20. This allows the apparatus 20 to print out the document on which the image code 9 is formed.

(4) The user fills in a required item on the document for the read workflow. The user does not necessarily need to perform filling in.

Next, the read workflow will be described with reference to FIG. 1B.

(1) The apparatus 20 reads the document in which the user has filled in the required item.

(2) The apparatus 20 reads the document and transmits generated image data (input data) to the information processing system 10. The information processing system 10 analyzes the image code 9 to extract the document type. The information processing system 10 acquires the processing method corresponding to the document type from a processing method storage 13. Processing method information (ID: document type: processing method) is registered in the processing method storage 13. The ID is identification information that identifies the document. The document type is information that identifies the manuscript, such as the document name of various manuscripts (for example, an application form). The processing method indicates how the image data of the manuscript is processed in the read workflow.

(3) Further, the information processing system 10 analyzes the image code 9 and extracts the identification information of output material. Then, the information processing system 10 determines whether the identification information of the output material processed in the past is the same as the identification information of the extracted output material (duplication determination). For example, the information processing system 10 records the identification information of output material extracted from the image code 9 in the past and determines whether there is the same identification information of output material as identification information of output material acquired from the image code 9 currently. If identification information is the same as the identification information of output material extracted in the past, the information processing system 10 notifies the user that an error has occurred by e-mail or the like.

(4) When the identification information of output material is not duplicated, the information processing system 10 processes the image data of the document based on the processing method corresponding to the document type. For example, the information processing system 10 distributes the image data to a folder designated by the processing method, or sends the image data by e-mail.

In this way, the information processing system 10 can detect duplicate documents based on the identification information of output material. Therefore, it is possible to prevent the employee from filing duplicate documents for expenses.

Further, the image code 9 of the output material includes the document type, and the output material being read is processed based on the processing method corresponding to the document type. The administrator may newly register "ID: document type: processing method" in the processing method storage 13, or may change the already stored processing method, so the workflow can be easily extended.

Terminology

The output material is the printed output from the apparatus. For example, the output material is printed matter, and the printed matter may be called a document or paper. In the present embodiment, the term document is used.

A type of output material is information indicating the kind of output material. In the present embodiment, the term "document type" is used.

The identification information of output material is information that identifies each output material. Therefore, even if the type of output material is the same, the identification information of output material is different. In the present embodiment, date and time information on which the output material is printed will be described as an example of the identification information of output material.

Detecting image data generated from the same output material means that the image data is generated from the same output material multiple times and transmitted from the apparatus to the information processing system. The same output material means not only the document type is same, but also the output material is same. In the present embodiment, the description will be simply expressed such as detecting duplicate image data. Duplicate image data can also be referred to as duplicate documents made by the user by having the apparatus read the document.

The processing method is information on how the information processing system processes the image data. For example, a distribution destination, a notification destination, a processing method, a transmission destination, and the like may be designated.

System Configuration Example

Figure 2:
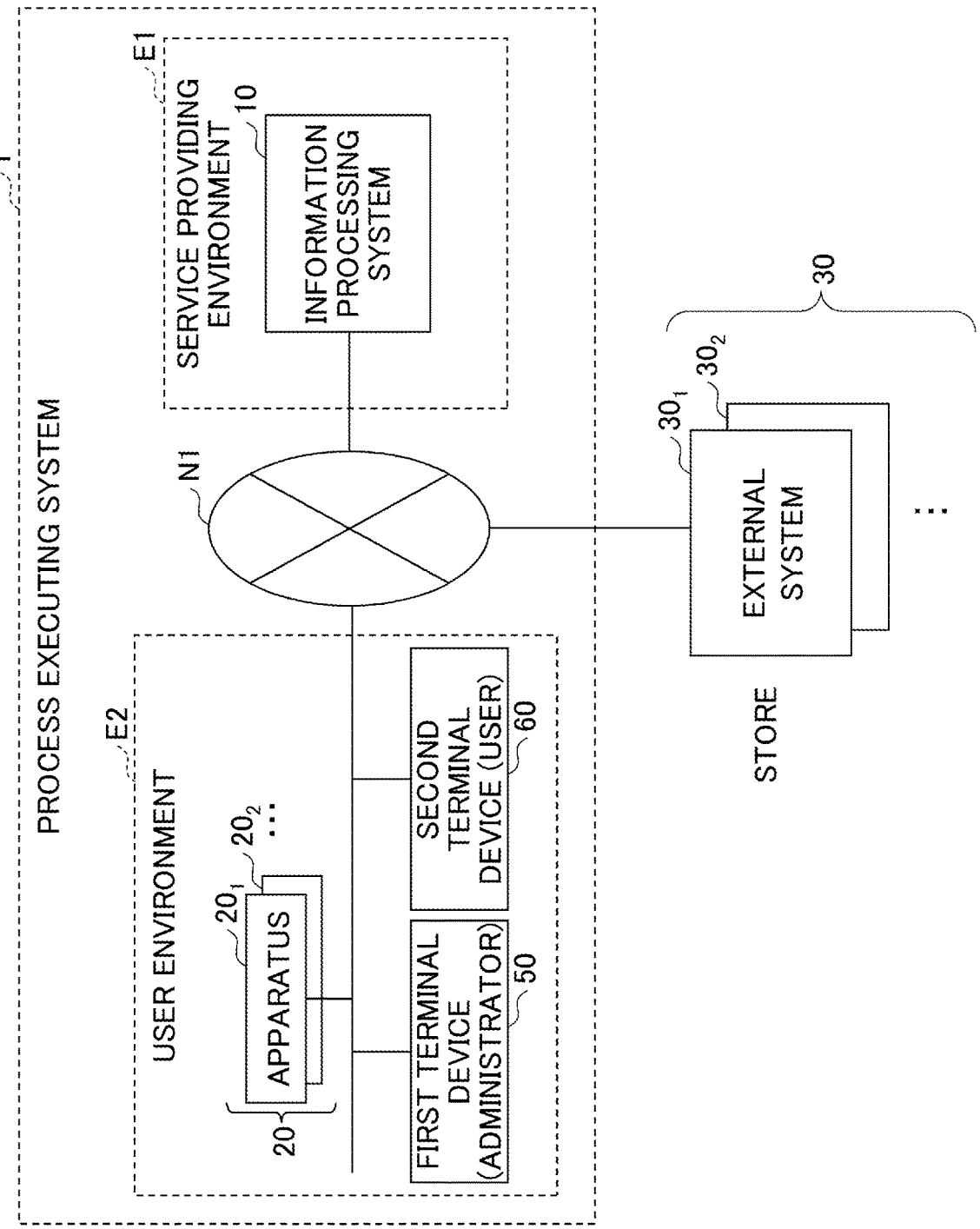
FIG. 2 is a configuration diagram of an example of the process executing system.

FIG. 2 is a configuration diagram of an example of the process executing system 1. The process executing system 1 illustrated in FIG. 2 includes a service providing environment E1, a user environment E2, and an external system 30, and is communicably connected via a wide area network N1 such as the Internet.

The service providing environment E1 is a system environment that provides an external service such as a cloud service via a network. In the present embodiment, the cloud service will be adopted as a specific example of the external service. However, services provided via the network such as a service provided by Application Service Provider (ASP) and Web service may be applied to the present embodiment.

The service providing environment E1 includes the information processing system 10 implemented by one or more information processing devices. The information processing system 10 provides a predetermined service via the network. For example, the information processing system 10 provides a service for storing electronic files that have been processed using Optical Character Reader (OCR), and generated by scanning a manuscript (a document in the present embodiment) in the apparatus 20 of the user environment E2 (a scan distribution service). Further, for example, the information processing system 10 provides a service for printing an electronic file stored in the external system 30 with the apparatus 20 of the user environment E2 (a cloud print service). In the present embodiment, the information processing system 10 will be described as providing the scan distribution service and the cloud print service.

However, the service provided by the information processing system 10 is not limited to these, and may be, for example, a service that projects an electronic file stored in the external system 30 with a projector of the user environment E2. Further, this service may perform an OCR process on the electronic file generated by scanning in the apparatus 20, translate it into a predetermined language (for example, English to Japanese), and store it in the external system 30.

Note that all or part of the information processing system 10 may be installed in the user environment E2. That is, all or a part of the information processing apparatus constituting the information processing system 10 may be included in the user environment E2.

The user environment E2 is, for example, a system environment such as a company that uses the apparatus 20. In the user environment E2, one or more apparatuses 20, a first terminal device 50, and a second terminal device 60 are connected via a network such as a LAN (Local Area Network).

The apparatus 20 according to the present embodiment is an image forming apparatus including a printer function and a scanner function. The apparatus 20 may be a multifunction peripheral including a copy function and a FAX communication function, or the like. Hereinafter, for distinguishing each of multiple apparatuses 20, subscripts such as "apparatus $20_1$" and "apparatus $20_2$" will be used.

The apparatus 20 may be a separate apparatus including the printer function from the scanner function. Even in a case of the apparatus 20 including the printer function and the scanner function, an apparatus 20 for printing and an apparatus 20 for scanning may be different. Further, the apparatus 20 may include a browser, as described below. The browser can display or process Web applications constituting a workflow for various services of the information processing system 10 and can perform instructions for process execution. A dedicated application may be installed on the apparatus 20, and the apparatus 20 may execute the same process by linking the dedicated application and the Web application. In such a case, the dedicated application may share a part of the process of the Web application.

The first terminal device 50 is an information processing device such as a smartphone, a mobile phone, a tablet PC, a desktop PC, or a notebook PC operated by an administrator. The first terminal device 50 is equipped with a program including a screen display function such as a Web browser. The program is not limited to the Web browser as long as the other program includes a function of displaying screen information received from the information processing system 10 as a screen. The program may be a dedicated program on the information processing system 10. Note that multiple administrators may perform their own operations using different first terminal devices 50.

The second terminal device 60 is an information processing device such as a smartphone, a mobile phone, a tablet PC, a desktop PC, or a notebook PC used by a general user. The second terminal device 60 is equipped with a program including a screen display function such as a Web browser. The program is not limited to the Web browser as long as including a function of displaying screen information received from the information processing system 10 as a screen. The program may be a program dedicated to the information processing system 10. Note that multiple users may perform their own operations using different second terminal devices 60.

The external system 30 is a core system of the company, a system provided by an external company, or the like. The external system 30 is, for example, a computer system that provides a cloud service called a storage service (or online storage) via a network. The storage service is a service that rents out a storage area of storage of the external system 30. In the present embodiment, in the scan distribution service, the OCR-processed electronic file is stored (uploaded) in the storage area of the external system 30. Further, in the cloud service of the present embodiment, an electronic file to be printed is acquired (downloaded) from the storage area of the external system 30. Hereinafter, for distinguishing each of multiple external systems 30, subscripts such as "external system $30_1$" and "external system $30_2$" will be used. Further, the name of the service provided by the external system $30_1$ is referred to as "storage service A", and the name of the service provided by the external system 30₂ is referred to as "storage service B".

The external system 30 may be a system implemented by multiple information processing devices. Further, the configuration of the process executing system 1 illustrated in FIG. 2 is an example, and an alternative configuration may be adopted. For example, as described above, the user environment E2 may include various apparatuses such as a projector and an electronic blackboard in addition to or in place of the apparatus 20.

<Hardware Configuration>
<<Information Processing System>>

Figure 3:
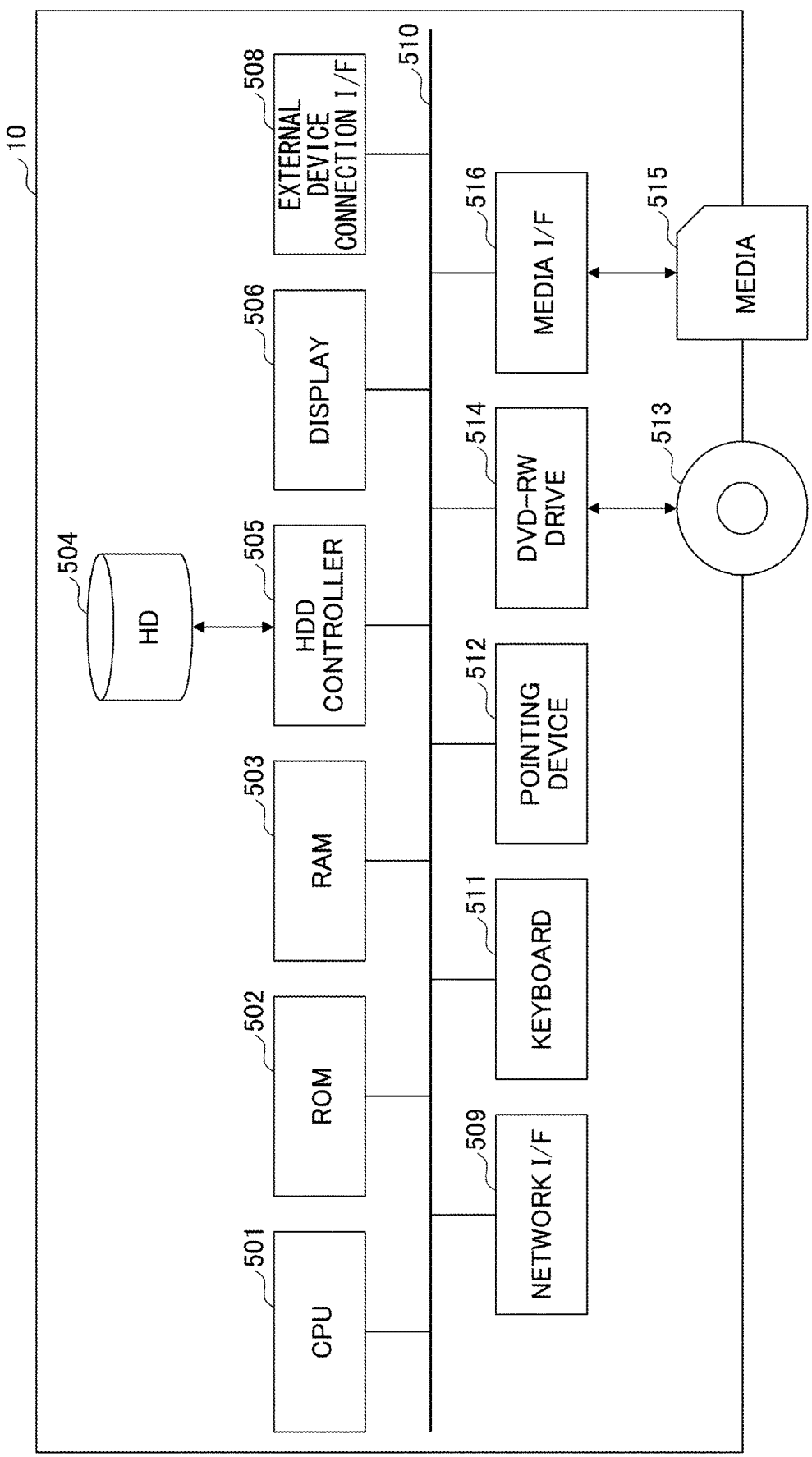
FIG. 3 is a hardware configuration diagram of an example of the information processing system.

FIG. 3 is a hardware configuration diagram of the information processing system. As illustrated in FIG. 3, the information processing system is configured by a computer, and as illustrated in FIG. 3, a CPU 501, a ROM 502, a RAM 503, an HD 504, a Hard Disk Drive (HDD) controller 505, a display 506, an external device connection Interface (I/F) 508, a network I/F 509, a bus line 510, a keyboard 511, a pointing device 512, a Digital Versatile Disk Rewritable (DVD-RW) drive 514, and a media I/F 516 are included in the information processing system.

The CPU 501 controls the operation of the entire information processing system. The ROM 502 stores programs used to drive the CPU 501, such as an Initial Program Loader (IPL). The RAM 503 is used as a work area of the CPU 501. The HD 504 stores various data such as programs. The HDD controller 505 controls reading or writing of various data to the HD 504 according to the control of the CPU 501. The display 506 displays various information such as cursors, menus, windows, characters, or images. The external device connection I/F 508 is an interface for connecting various external devices. The external device in this case is, for example, a Universal Serial Bus (USB) memory, a printer, or the like. The network I/F 509 is an interface for performing data communication using a communication network 100. The bus line 510 is such as an address bus or a data bus for electrically connecting each component such as the CPU 501 illustrated in FIG. 3.

Further, the keyboard 511 is a kind of input means including multiple keys used for inputting characters, numerical values, various instructions, and the like. The pointing device 512 is a kind of input means for selecting and executing various instructions, selecting a processing target, and moving a cursor. The DVD-RW drive 514 controls reading or writing of various data to the DVD-RW 513 as an example of a removable recording medium. Note that the DVD-RW drive 514 is not limited to a DVD-RW, and may be such as a DVD-R. The media I/F 516 controls reading or writing (storage) of data to a recording medium 515 such as a flash memory.

The hardware configurations of the first terminal device 50, the second terminal device 60, or the external system 30 may be the same as or different from FIG. 3, but do not affect the description of the present embodiment.

<<Apparatus>>

Figure 4:
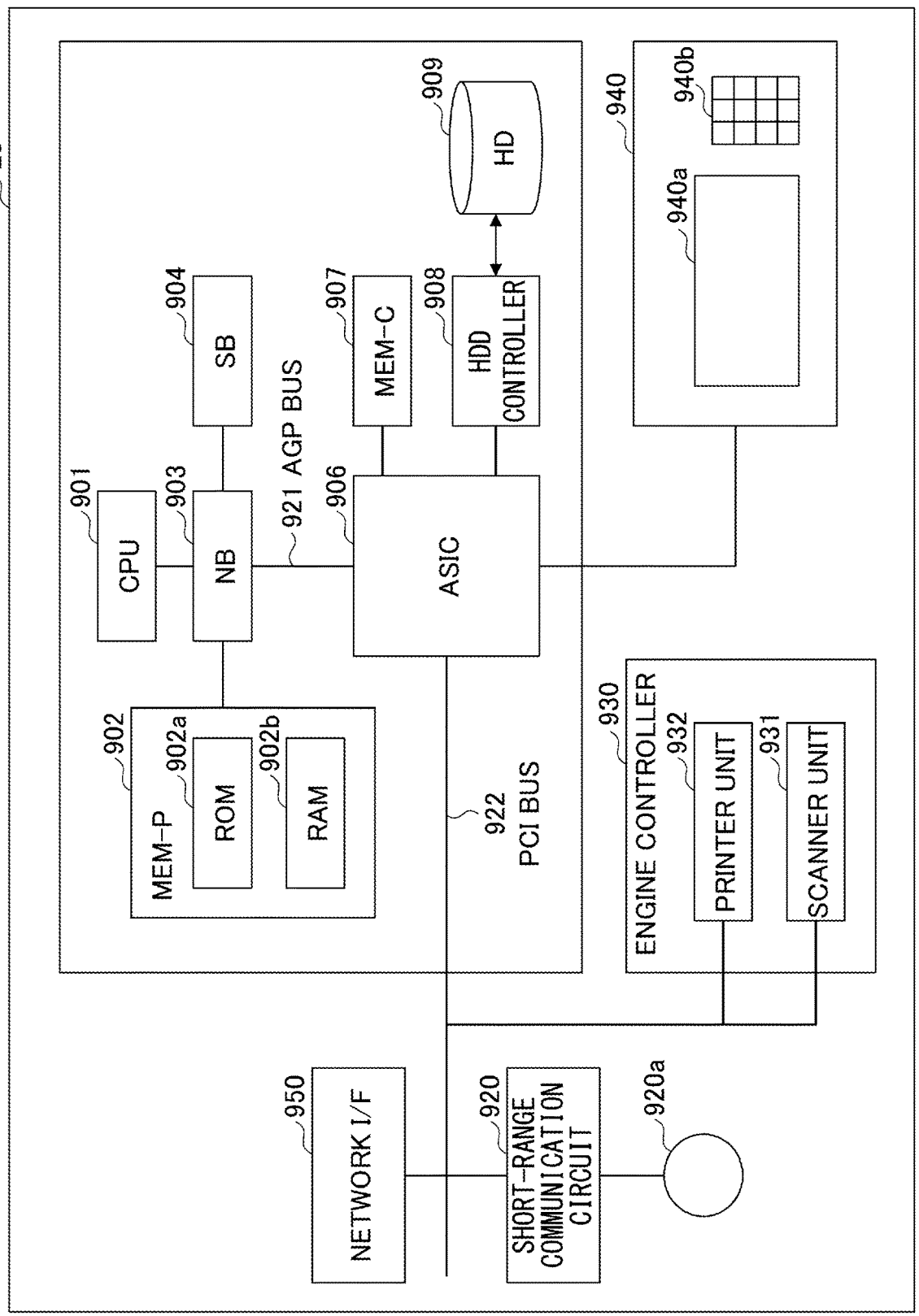
FIG. 4 is a hardware configuration diagram of an example of an apparatus.

FIG. 4 is a hardware configuration diagram of the apparatus. As illustrated in FIG. 4, the apparatus includes a controller 910, a short-range communication circuit 920, an engine controller 930, an operation panel 940, and a network I/F 950. The hardware configuration of the apparatus 20 is not limited to the configuration illustrated in FIG. 4. For example, the operation panel 940 may be connected to an SB 104 instead of an ASIC 906.

The controller 910 includes a CPU 901 which is a main part of the computer, a system memory (MEM-P) 902, a north bridge (NB) 903, a south bridge (SB) 904, an Application Specific Integrated Circuit (ASIC) 906, a local memory (MEM-C) 907 which is the storage, an HDD controller 908, and an HD 909 which is a storage. The controller has a configuration in which the NB 903 and the ASIC 906 are connected by an Accelerated Graphics Port (AGP) bus 921. However, the configuration of the controller 910 is not limited to this. For example, two or more components such as the CPU 901, the NB 903, and the SB 904 may be implemented by a System on Chip (SoC). In this case, the SoC and the ASIC 906 may be connected by a PCI-express (registered trademark) bus.

The CPU 901 is a control unit that controls the entire apparatus 20. The NB 903 is a bridge for connecting the CPU 901, the MEM-P 902, the SB 904, and the AGP bus 921. The NB 903 includes a memory controller configured to control reading and writing to the MEM-P 902, a Peripheral Component Interconnect (PCI) master, and an AGP target.

The MEM-P 902 includes a ROM 902a which is a memory for storing a program and data for implementing each function of the controller 910 and a RAM 902b used as video memory for developing a program and data, and for memory printing. The program stored in the RAM 902b may be configured to be recorded and provided on a computer-readable recording medium such as a CD-ROM, CD-R, or DVD in an installable format or executable format file.

The SB 904 is a bridge for connecting the NB 903 to a PCI device and a peripheral device. The ASIC 906 is an Integrated Circuit (IC) for image processing including a hardware element for image processing and has a role of a bridge connecting each of the AGP bus 921, a PCI bus 922, the HDD controller 908, and the MEM-C 907. The ASIC 906 includes a PCI target and an AGP master, an arbiter (ARB) which is the core of the ASIC 906, a memory controller configured to control the MEM-C 907, multiple Direct Memory Access Controllers (DMACs) configured to perform such as rotating image data by a hardware logic, and a PCI unit configured to transfer data between a scanner unit 931 and a printer unit 932 via the PCI bus 922. A Universal Serial Bus (USB) interface or an Institute of Electrical and Electronics Engineers 1394 (IEEE 1394) interface may be connected to the ASIC 906.

The MEM-C 907 is a local memory used as a copy image buffer and a code buffer. The HD 909 is storage configured to accumulate image data, to accumulate font data used at the time of printing, and to accumulate a form. The HD 909 controls the reading or writing of data to the HD 909 according to the control of the CPU 901. The AGP bus 921 is a bus interface for a graphics accelerator card proposed for speeding up graphic processing and is capable of speeding up the graphics accelerator card by directly accessing the MEM-P 902 with high throughput. However, the MEM-C 107 may be omitted.

Further, the short-range communication circuit 920 is provided with an antenna 920a of the short-range communication circuit 920. The short-range communication circuit 920 is a communication circuit such as NFC or Bluetooth (registered trademark).

Further, the engine control unit 930 includes a scanner unit 931 and a printer unit 932. Further, the operation panel 940 includes a display unit 940a and a hard key 940b. The display unit 940a is such as a touch panel that displays such as a current setting value or selection screen to accept an input from an operator. The hard key 940b includes a numeric keypad for accepting the setting value of a condition related to image formation such as a density setting condition and a start key for accepting an instruction of copy start. The controller 910 performs control of the entire apparatus 20, and controls, for example, drawing, communication, input from the operation panel 940, and the like. The scanner unit 931 or the printer unit 932 includes an image processing unit such as for error diffusion and gamma conversion.

The apparatus 20 can select a document box function, a copy function, a printer function, and a facsimile function sequentially through an application switching key on the operation panel 940. A document box mode is set when the document box function is selected. A copy mode is set when the copy function is selected. A printer mode is set when the printer function is selected. A facsimile mode is set when the facsimile function is selected. The operation panel 940 includes a display processing unit 21 such as an LCD for displaying various information and an LED for displaying an operating state by turning on/off, and an input unit including a touch panel or a hard key switch. If the operation panel 940 is provided with a touch panel, the hard key switch may not be provided.

Further, the network I/F 950 is an interface for performing data communication using the communication network 100. The short-range communication circuit 920 and the network I/F 950 are electrically connected to the ASIC 906 via the PCI bus 922.

<Functions>

Figure 5:
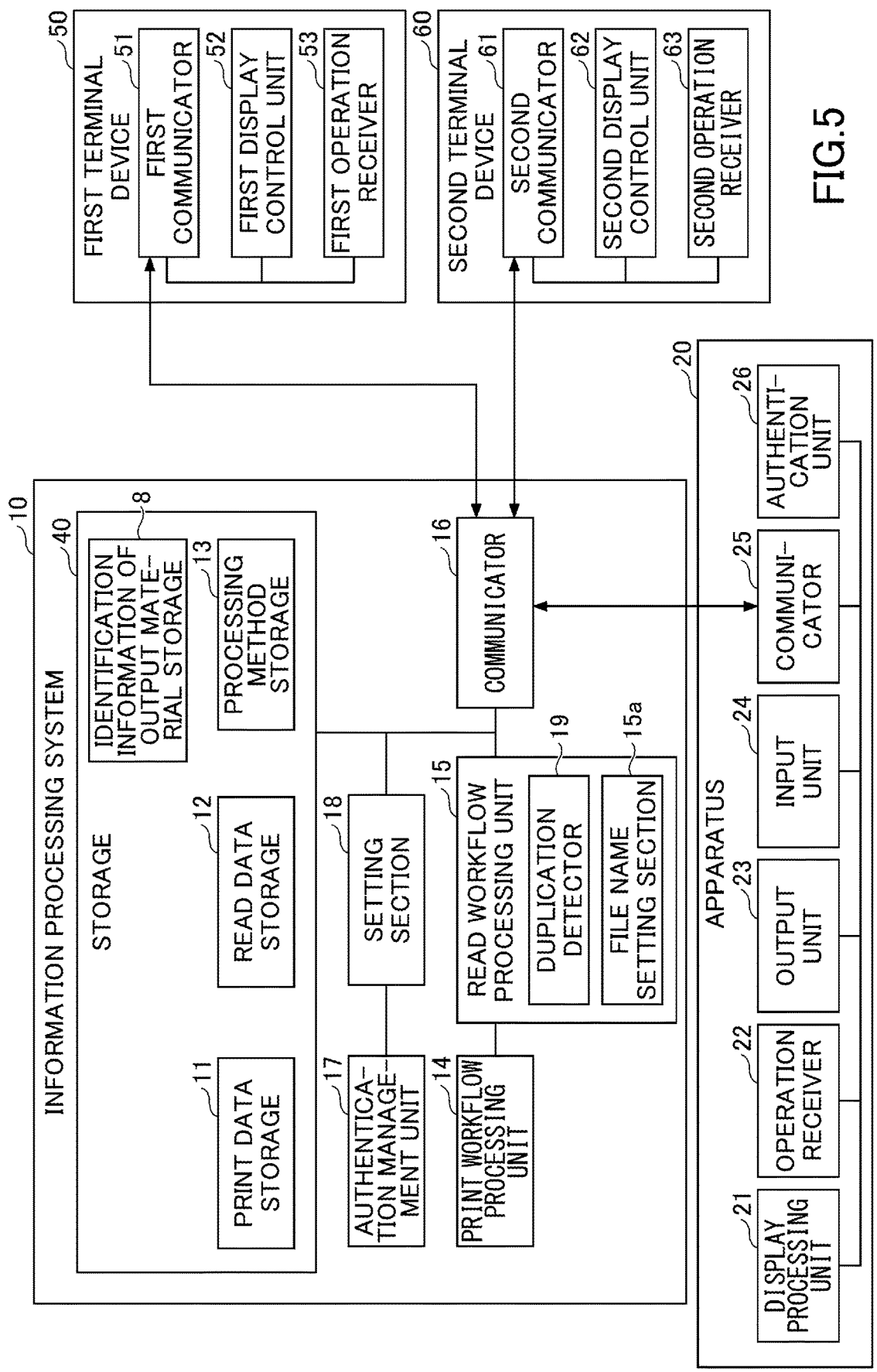
FIG. 5 is a functional block diagram illustrating a function of the information processing system and the apparatus.

FIG. 5 is an example of a functional block diagram illustrating a function of the information processing system 10, the apparatus 20, the first terminal device 50, and the second terminal device 60 in a block shape.

<<Apparatus>>

The apparatus 20 includes the display processing unit 21, an operation receiver 22, an output unit 23, an input unit 24, a communicator 25, and an authentication unit 26. Each of the functions processed by the apparatus 20 is a function or means implemented by any one of the components illustrated in FIG. 4. Each of the functions are operated by an instruction from the CPU 901 according to a program expanded on the RAM 902b from the HD 909. The program is downloaded from a predetermined server and installed in the apparatus 20.

The display processing unit 21 displays a screen operated by the user on the operation panel 940. For example, the display processing unit 21 displays such as a button for activating a workflow, a list of document types, a message for guiding an operation, print settings, and reading settings.

The operation receiver 22 receives an operation on the apparatus 20. For example, the operation receiver 22 receives such as a selection of the workflow to be started, the document type used for the workflow, and the like.

The output unit 23 prints out print data transmitted from the information processing system 10. The printing may be referred to as output. The print data may be converted into Printer Description Language (PDL) by the information processing system 10 or may be converted by the apparatus 20.

The input unit 24 optically reads the document, which is a sheet material such as paper, to create image data (input data). The reading also may be referred to as scan, and the image data may be referred to as scan data. The document may have two or more pages.

The communicator 25 (an example of a second communicator) connects the apparatus 20 to the network to transmit and receive various information. For example, the print data is received from the information processing system 10, and the image data (input data) generated by reading the document is transmitted to the information processing system 10.

The authentication unit 26 authenticates the user. The authentication means determines whether the user is a legitimate authorized person. In the present embodiment, the authentication means whether the user has a permission to use the information processing system 10. If the authentication is successful, the user logs in to the apparatus 20. The login is an authentication act to access system resources using pre-registered account information when using various services on a computer or the Internet. The account information includes a user ID and password, an IC card number, biometric authentication information, and the like.

<<First Terminal Device>>

The first terminal device 50 includes a first communicator 51, a first display control unit 52, and a first operation receiver 53. The first terminal device 50 implements the functional blocks as illustrated in FIG. 5 by executing a program (for example, the Web browser).

The first communicator 51 communicates with the information processing system 10 and receives screen information for the first terminal device 50 to display a screen such as a setting screen. Further, the first communicator 51 transmits the information input by the administrator on each screen to the information processing system 10.

The first display control unit 52 analyzes the screen information of the screen received from the information processing system 10 to display on the display 506. The first operation receiver 53 receives an administrator's operation (for example, input to each screen) on the first terminal device 50.

<<Second Terminal Device>>

The second terminal device 60 includes a second communicator 61, a second display control unit 62, and a second operation receiver 63. The second terminal device 60 implements a functional block as illustrated in FIG. 5 by executing a program (for example, the Web browser).

The second communicator 61 communicates with the information processing system 10 and receives screen information for displaying image data such as an application form. Further, the second communicator 61 transmits the information input by a person in charge of processing on each screen to the information processing system 10.

The second display control unit 62 analyzes the screen information of the screen received from the information processing system 10 to display on the display 506. The second operation receiver 63 receives an operation by the person in charge of processing (for example, input to each screen) on the second terminal device 60.

<<Information Processing System>>

The information processing system 10 includes a print workflow processing unit 14, a read workflow processing unit 15, a communicator 16, an authentication management unit 17, and a setting section 18. Each of the functions processed by the information processing system 10 is a function or means implemented by any one of the components, illustrated in FIG. 3, operated by an instruction from the CPU 501 according to a program expanded on the RAM 503b from the HD 504.

The print workflow processing unit 14 controls the execution of the print workflow. For example, an image code is attached in the print data of the document and transmitted to the apparatus 20.

The read workflow processing unit 15 controls the execution of the read workflow. For example, the image code is decoded by analyzing the image data transmitted by the apparatus 20, and the processing method of the read workflow is determined. The read workflow processing unit 15 includes a duplicate detector 19 and a file name setting section 15*a*.

The duplicate detector 19 determines whether the identification information of the output material included in the image data (input data) previously transmitted from the apparatus 20 includes any duplicates of the identification information of output material included in the image data (input data) newly transmitted from the apparatus 20. If a duplicate is found, the duplicate detector 19 detects that the image data (input data) newly transmitted from the apparatus 20 is a duplicate.

The file name setting section 15*a* sets a file name in the image data based on a file name assignment rule described below.

The print workflow processing unit 14 and the read workflow processing unit 15 may execute the workflow in cooperation with the core system of the company, or may execute the workflow in cooperation with the system provided by an external system (such as another company).

The communicator 16 (an example of the first communicator) connects the information processing system 10 to a network to transmit and receive various information. For example, the print data of the document selected by the user is transmitted to the apparatus 20, and the image data (input data) is received from the apparatus 20. Further, the image data (input data) is transmitted to the external system 30 to request processing. Further, the information regarding the setting of the application is received from the first terminal device 50, and the information regarding the processing of the application form is transmitted and received from the second terminal device 60.

The authentication management unit 17 controls authentication. For example, the following is managed for each company:
information of the registered user, the administrator, and the apparatus;
an application in contract (in use); and
a license information of contract application.

The presence/absence of permission for use is authenticated based on the above information and information transmitted from the apparatus 20, the first terminal device 50, or the second terminal device 60. When using the Web application that constitutes various workflows or the following setting unit 18 from each apparatus or a terminal device, the authentication management unit 17 functions as an authentication management platform that provides services such as authentication, a determination of permission for use, and information management.

The setting section 18 accepts settings related to an application document print service 601 (corresponding to the print workflow), described below, and a simple application service 602 (corresponding to the read workflow) from the first terminal device 50. The setting section 18 is a Web server (setting site) that is capable of being accessed by the first terminal device 50 or the second terminal device 60 with the Web browser. Further, the setting section 18 accepts settings stored in the processing method storage 13, the print data storage 11, and a read data storage 12 as reference destinations to be referred to when the print workflow and the read workflow are executed. The setting section 18 may form a part of the Web application constituting various workflows. If a contract is made for the Web application for various workflows at the company and use is begun for various workflow, the corresponding setting section (setting site) will also be available.

Further, the information processing system 10 includes a storage 40 implemented by one or more of the HD 504, the RAM 503, and the ROM 502 illustrated in FIG. 3. The storage 40 is configured by the print data storage 11, the read data storage 12, the processing method storage 13, and an identification information of output material storage 8.

The print data storage 11, the read data storage 12, the processing method storage 13, and the identification information of output material storage 8 in the storage 40 are not required to be provided in the information processing system 10. For example, a storage may be on the cloud, or may be on the external system 30 illustrated in FIG. 2. Private or public storage services (for example, cloud storage services such as Google Drive (registered trademark), One Drive (registered trademark) and the like) may be used. Further, the print data storage 11, the read data storage 12, the processing method storage 13, and the identification information of output material storage 8 in the storage 40 may exist on-premises instead of on the cloud. Further, all of the print data storage 11, the read data storage 12, the processing method storage 13, and the identification information of output material storage 8 may be provided in different folders or the same folder of the same cloud storage service, or may be provided in a plurality of different cloud storage services (external systems $30_1$, $30_1$ . . . ).

The print data storage 11 stores the print data of the document to be printed by the apparatus 20. The print data is a file created by Portable Document Format (PDF) or various application software.

The read data storage 12 corresponds to a distribution destination folder and the image data (input data) read and generated by the apparatus 20 is stored in the read data storage 12.

As described above, the processing method storage 13 is associated with "ID: document type: processing method". The ID is the document type or the identification information for identifying the document as described above. The processing method storage 13 may be a folder for storing a file or a database. FIG. 26 illustrates an example of the processing method information stored in the processing method storage 13.

FIG. 26 illustrates an example of the processing method information stored in the processing method storage 13. The processing method information specifies the processing method (transmission destination folder, notification destination, etc.) for each document type. For example, if the document is an invoice, the transmission destination folder of the scanned data is "under the folder/seikyuu", and at the same time, the notification is sent to "aaa@bb.cc" by e-mail. There may be a processing method other than the method illustrated in FIG. 26, one processing method may be provided, and the processing method is not limited to two methods. For example, an item such as a transmission destination of FAX (both of telephone line type and Internet fax are available) may be provided.

Even for the same document type, different processing methods may be associated with each other depending on the purpose of use and the time of use. For example, the storage destination folder can be switched depending on the month of application. In order to support such processing, the administrator registers different IDs on the storage 13 even if the document types are the same so that different processing methods can be defined for each different ID depending on the document even if the document type is the same.

The document type item is used in the print workflow, and the document type and processing method are used in the read workflow. Therefore, the print workflow and the read workflow can be linked by the document type (or ID).

The URL of the processing method storage. 13 is known to the print workflow processing unit 14 and the read workflow processing unit 15. If necessary, the administrator sets the URL in the print workflow processing unit 14 and the read workflow processing unit 15. As a result, each of the print workflow processing unit 14 and the read workflow processing unit 15 can execute the workflow with reference to the processing method storage 13.

FIG. 27 illustrates an example of a file in which processing method information is described. The administrator uses a file as illustrated in FIG. 27 to add new processing method information to the print data storage 11 and delete or edit old processing method information from the print data storage 11. The administrator can set any ID (No. in FIG. 27) and any processing method (transmission destination and notification destination). The file name is the file name of the document type file (not used in the present embodiment).

A format of the processing method information may be, for example, a spreadsheet file, comma-separated values (CSV), XML, JSON, or a simple text file in which "ID, document type, processing method" is described. Further, when the administrator registers in the database format, "ID, document type, processing method" is registered by operating a database client operating on the Personal Computer (PC).

FIG. 28 illustrates an example of the identification information of output material stored in the identification information of output material storage 8. The identification information of output material storage 8 stores a list of identification information of output material that has been analyzed and decoded by the read workflow processing unit 15 for the image data transmitted by the apparatus 20. The identification information of output material in FIG. 28 is the date and time information in the format of yyyyMMd-dHHmmss. The date and time information is, for example, the date and time when the output material is printed. Since the date and time are in seconds, uniqueness is nearly maintained.

More preferably, as illustrated in FIG. 28, the identification information of output material storage 8 may also include the user ID of the user who printed the output material. Considering that the same user does not print two output materials at the same time, the uniqueness can be ensured easily.

Example of Workflow

Figure 6:
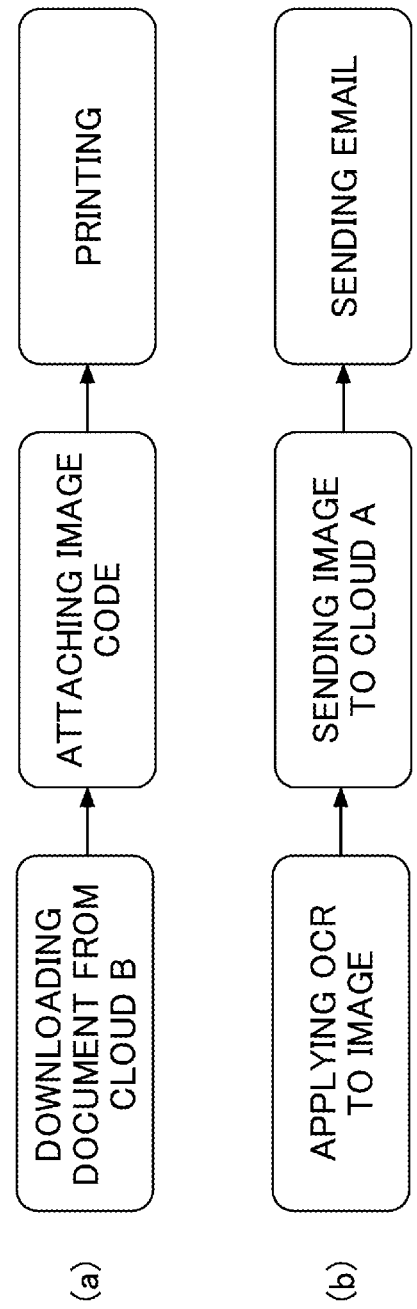
FIG. 6 is a diagram illustrating an example of a workflow.

FIG. 6 is a diagram illustrating an example of the workflow. FIG. 6(a) illustrates an example of the print workflow, and FIG. 6(b) illustrates an example of the read workflow.

The print workflow is to execute a series of processes of "downloading document from Cloud B", "attaching image code", and "printing" in order. The read workflow executes a series of processes of "applying OCR to image", "sending image to Cloud A", and "sending email" in order.

The administrator can set the workflow in advance. In the present embodiment, the workflow can be constructed on the user side without a program. For example, the workflow can be set by combining (connecting) each process of FIG. 6 with a Graphical User Interface (GUI). In the example of FIG. 6(b), by preparing the "function of applying OCR to the image", "function of sending the image to Cloud A", and "function of sending an email" in advance and connecting them as illustrated in FIG. 6(b), one workflow can be set without a program.

Note that each process of the workflow is not limited to the process completed in the information processing system 10, and the process may be transferred to the external system. In this case, the information processing system 10 transfers the process via the Web Application Programming Interface (API) of the external system. Although the Web API is not defined strictly, it is an interface between applications or systems called over a network using a protocol such as HTTP.

<Print Workflow and Read Workflow Settings>

FIG. 7 is an example of the setting screen 300 related to the print workflow. The administrator operates the first terminal device 50 to connect to the information processing system 10, and causes the first terminal device 50 to display the screen of FIG. 7.

The print workflow setting screen 300 includes a storage account setting field 301, a print data storage destination setting field 302, a processing method storage destination setting field 303, a print setting field 304, and an imago code addition method setting field 306. The storage account setting field 301 is a field used by the administrator. The administrator selects account information of the user for the information processing system 10 to access the storage (cloud storage service). The account information is, for example, a user ID (email address) and a password. In FIG. 7, a list of users is displayed in a drop-down manner, and the account information is also set when the administrator selects the user. The print data storage destination setting field 302 is a field used by the administrator. The administrator sets path information of the folder of the print data storage destination (for example, the print data storage 11). For example, "/storage/print_data/" may be set. This is an acquisition destination for acquiring a file name list in step S14 (FIG. 11) and acquiring print data in step S20, which will be described below. The processing method storage destination setting field 303 is a field used by the administrator. The administrator sets the path information of the folder of the processing method storage destination (for example, the processing method storage 13). For example, "/storage/process_data/" may be set.

Because the API and connection method differ depending on the storage to be used, one API or connection method is fixedly set for each Web application (workflow application) or package. However, multiple storages may also be switchable. The print setting field 304 is a field for a set value. The set value in the apparatus 20 (for example, an image forming apparatus) is inputted to the print setting field 304 at the time of outputting print data. The set value can be fixed by the administrator. Since a setting item is added by the + button 305, multiple inputs can be inputted. The setting items are as follows:

Size: A4/A3;
Color: Monochrome/Color/Two colors;
Post-processing: punch/staple, etc; and
Print with processing method information added (the destination, the person in charge of processing, handling of the document).

The image code attaching method setting field 306 is available to the administrator for selecting the processing method to be used (information to be coded). By pressing the + button 307, one of the following setting items can be selected;

Addition of a document type (or at least one of the document types and ID) as an image code;
Addition of identification information of a logged-in user as an image code;

Addition of both the document type (or at least one of the document types and ID) and the identification information of the user as an image code; and No image code added.

FIG. 8 is an example of the setting screen 310 related to the read workflow. The administrator operates the first terminal device 50 to connect to the information processing system, and causes the first terminal device 50 to display the screen of FIG. 8.

The read workflow setting screen 310 includes a storage account setting field 311, a processing method storage destination setting field 312, a read data storage destination setting field 313, a read setting field 314, and a processing method selection field 316. The storage account setting field 311 is same as the storage account setting field 301 of the setting screen 300 related to the print workflow illustrated in FIG. 7. The processing method storage destination setting field 312 is a field used by the administrator. The administrator sets the path information of the folder of the processing method storage destination (for example, the processing method storage 13). For example, "/storage/print_data/" may be set. If the setting of the print workflow (the application document print service 601) is input here, the information processing system refers to it and follows the setting content. The read data storage destination setting field 30 is a field used by the administrator. The administrator sets the path information of the folder of the storage destination (for example, the read data storage 12) of the image data generated by the apparatus 20 (for example, the image forming apparatus) by reading the application form. For example, "/storage/scan_data/seikyuu" may be set. If the processing method storage destination setting field 312 is set, the read data storage destination setting field 313 may not be set.

For example, the administrator may select one of the following options: "If the read data storage destination setting field is not set, the storage destination or the transmission destination set in the processing method storage destination setting field is referred to", "In addition to the processing method, all image data is also stored in one storage destination", "Forcibly store all image data in one storage destination without applying the processing method." The read setting field 314 is a field for a set value. The set value in the apparatus 20 (for example, the image forming apparatus) is inputted to the read setting field 314 at the time of reading the application form. The set value can be fixed by the administrator. Because a setting item is added by the + button 315, the administrator can input multiple setting items such as:

Size: A4/A3;

Color: Monochrome/Color/Two colors;

Resolution: 200 dpi/300 dpi/400 dpi; and the like.

The processing method selection field 316 is a field used by the administrator. The administrator selects any one of the following by pressing the + button 317:

"Performing processing corresponding to the identification information of the document type (or ID)";

"Performing processing corresponding to the identification information of the logged-in user";

"Performing processing corresponding to both the document type (or ID) and the identification information of the user"; and "Following the settings for print (application document print service)"

"No process (sending)."

<Flow of Setting Process by Administrator and Execution of Application by User>

FIG. 9 is an example of a sequence diagram for describing a flow of setting of the print workflow and the read workflow, execution of the read workflow, and a confirmation processing of an application form.

S101: The administrator operates the first terminal device 50 to connect to the information processing system 10. Because the first display control unit 52 of the first terminal device 50 displays the login screen, the administrator inputs the authentication information. The first operation receiver 53 of the first terminal device 50 receives the input.

S102: The first communicator 51 of the first terminal device 50 transmits the authentication information to the information processing system. The authentication management unit 17 of the information processing system authenticates the administrator with the authentication information. That is, the authentication management unit 17 authenticates that the administrator has permission.

S103: The communicator 16 of the information processing system transmits an authentication ticket to the first terminal device 50. The authentication ticket is associated with the logged-in user, indicating who logged in and what the user can do.

S104: The administrator selects a workflow in order to make settings related to the print workflow or the read workflow. The first operation receiver 53 of the first terminal device 50 receives selection.

S105: The first communicator 51 of the first terminal device 50 requests the information processing system for a setting screen (screens of FIG. 7 and FIG. 8) of the selected application.

S106: The communicator 16 of the information processing system receives the request for the setting screen of the application, and the setting section 18 transmits the screen information of the setting screen to the first terminal device 50.

S107: The first communicator 51 of the first terminal device 50 receives the screen information of the setting screen. Since the first display control unit 52 displays a print workflow setting screen 300 or a read workflow setting screen 310, the administrator inputs a setting value. The first operation receiver 53 of the first terminal device 50 receives the input.

S108: The first communicator 51 of the first terminal device 50 transmits the setting value to the information processing system 10. The communicator 16 of the information processing system 10 receives the setting value, and the setting section 18 stores the setting value.

S109: A message that the setting value has been saved (OK) is transmitted to the first terminal device 50.

S110: The administrator can edit the processing method. The administrator displays, for example, a spreadsheet file or a file in which a processing method is described on the first terminal device 50 to edit the processing method for each ID. The first operation receiver 53 of the first terminal device 50 receives the editing. The edited processing method is stored in the external system 30.

S111: A message that the processing method has been saved (OK) is transmitted to the first terminal device 50.

Subsequently, the user executes the read workflow at the apparatus 20. The print workflow is assumed to have already been executed.

S112: The communicator 25 of the apparatus 20 transmits an authentication request to the information processing system 10 after activation. The identification information of the user or the apparatus is transmitted.

S113: The authentication management unit 17 of the information processing system 10 authenticates the user or the apparatus 20, and if the authentication is successful, an authentication ticket indicating permission to use is transmitted to the apparatus 20.

S114: The communicator 25 of the apparatus 20 transmits a workflow execution request selected by the user to the information processing system 10. For example, the apparatus 20 read the application form to generate the image data, and the communicator 25 of the apparatus transmits the image data to the information processing system 10.

S115: The communicator 16 of the information processing system 10 receives the workflow execution request, and the read workflow processing unit 15 acquires the setting value of the read workflow from the setting section 18.

S116: The read workflow processing unit 15 specifies a storage destination (the external system 30) of the processing method based on the setting value, and acquires the edited processing method information from the external system 30.

S117: The read workflow processing unit 15 transmits the image data to a notification destination address based on the processing method information. For example, an email is sent to a transaction manager.

S118: Further, the read workflow processing unit 15 transmits (stores) the image data to a transmission destination folder based on the processing method information.

Next, the person in charge of processing the application form confirms the application form.

S119: The person in charge of processing operates the second terminal device 60 to connect to the information processing system 10. Because the storage destination (folder of the external system 30) is notified to the second terminal device 60 by e-mail or the like, the person in charge of processing inputs an operation to open the destination folder. The second operation receiver 63 of the second terminal device 60 receives the input.

S120: The second communicator 61 of the second terminal device 60 connects to the destination folder.

S121: This allows the second communicator 61 of the second terminal device 60 to receive a list of image data (the application form, etc.) stored in the destination folder, and the second display control unit 62 is capable of displaying it.

S122: When the person in charge of processing selects the desired application form, the second communicator 61 of the second terminal device 60 receives the image data of the application form. The person in charge of processing can confirm the application form by the image data being displayed by the second display control unit 62.

<Operation Procedure>

Figure 10:
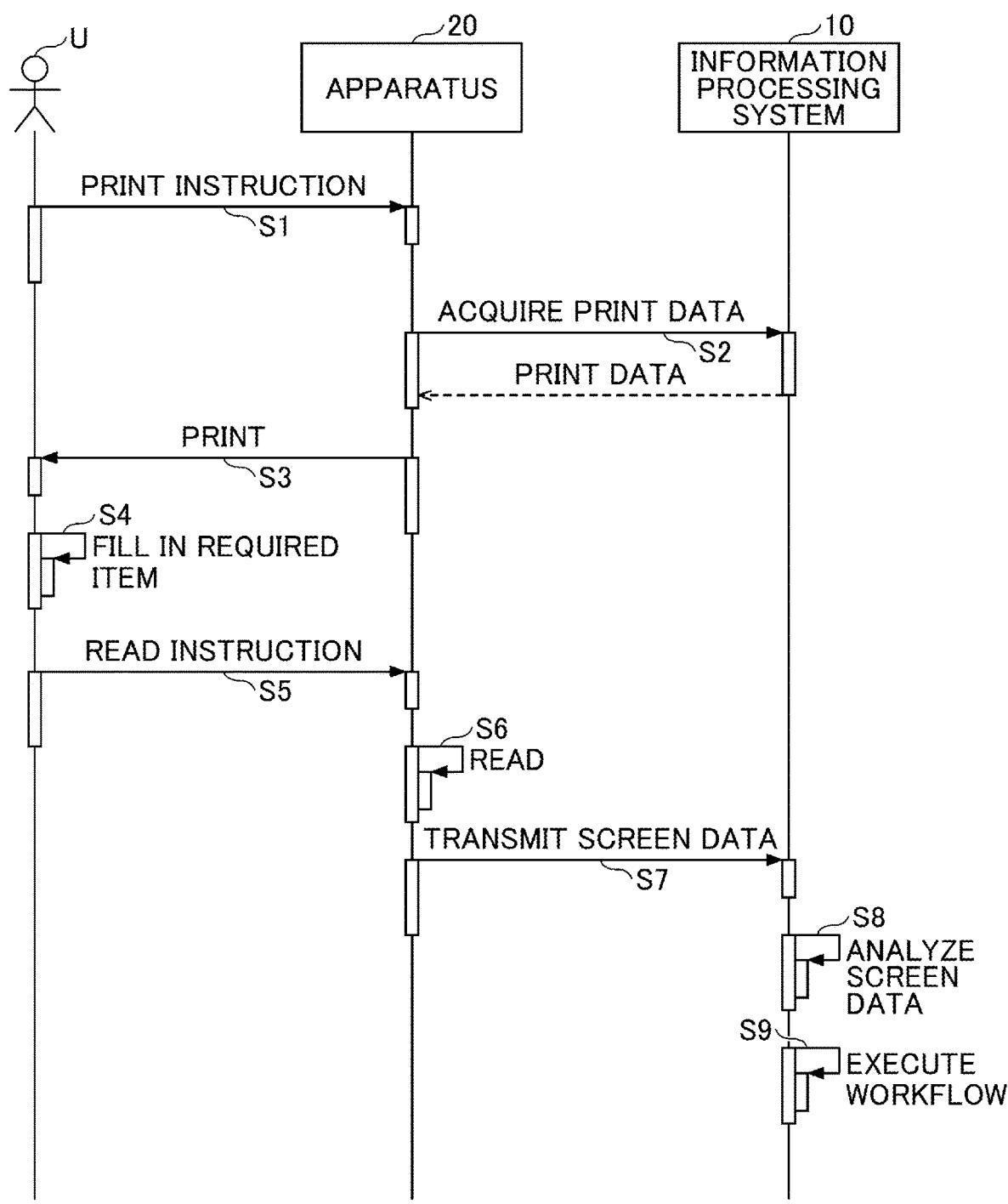
FIG. 10 is an example of a sequence diagram illustrating an overall flow of basic printing and reading.

Subsequently, an operation of the process executing system 1 will be described with reference to FIG. 10. First, FIG. 10 is a sequence diagram illustrating an overall flow of basic printing and reading.

S1: The user inputs a print instruction to the apparatus 20. The operation receiver 22 of the apparatus 20 receives the print instruction.

S2: The communicator 25 of the apparatus 20 acquires the print data of the document from the information processing system 10. The print workflow processing unit 14 of the information processing system 10 performs a series of processes as described in FIG. 6(a) on the print data of the document designated by the user.

S3: The output unit 23 of the apparatus 20 prints the print data.

S4: The user fills in a required item on the printed document.

S5: The user inputs the read instruction of the document written in the apparatus 20. The operation receiver 22 of the apparatus 20 receives the read instruction.

S6: The input unit 24 of the apparatus 20 optically reads the document and generates image data.

S7: The communicator 25 of the apparatus 20 transmits the image data to the information processing system 10.

S8: The read workflow processing unit 15 of the information processing system 10 analyzes the transmitted image data and acquires the document type.

S9: The read workflow processing unit 15 of the information processing system 10 performs a series of processes as described in FIG. 6(b) on the image data based on the read workflow.

In the following, details of the print workflow and the read workflow in FIG. 10 will be described.

<Process of Print Workflow>

Figure 11:
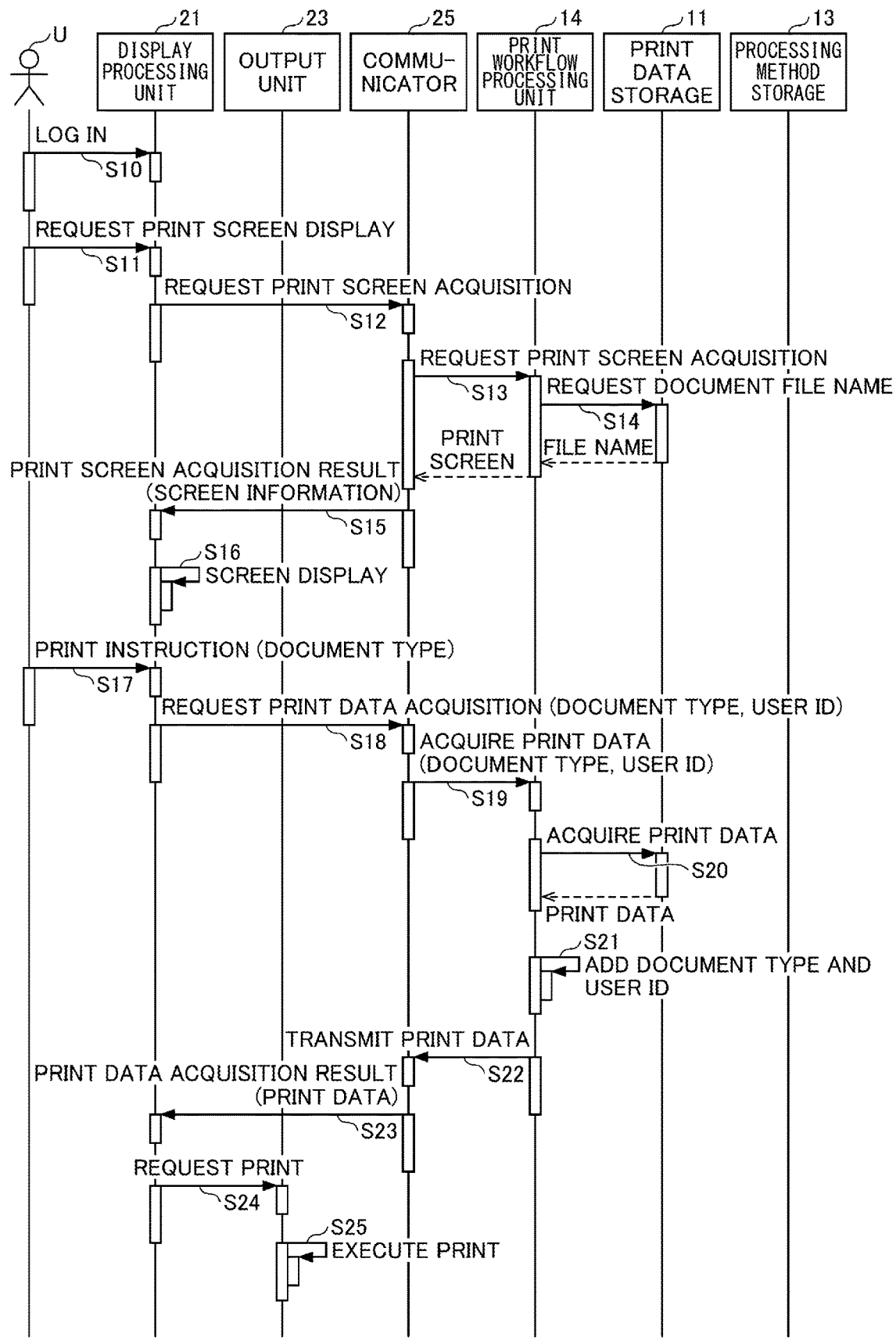
FIG. 11 is an example of a sequence diagram illustrating a process executed by the information processing system in the print workflow.

FIG. 11 is an example of a sequence diagram illustrating a process executed by the process executing system 1 in the print workflow.

Figure 12B:
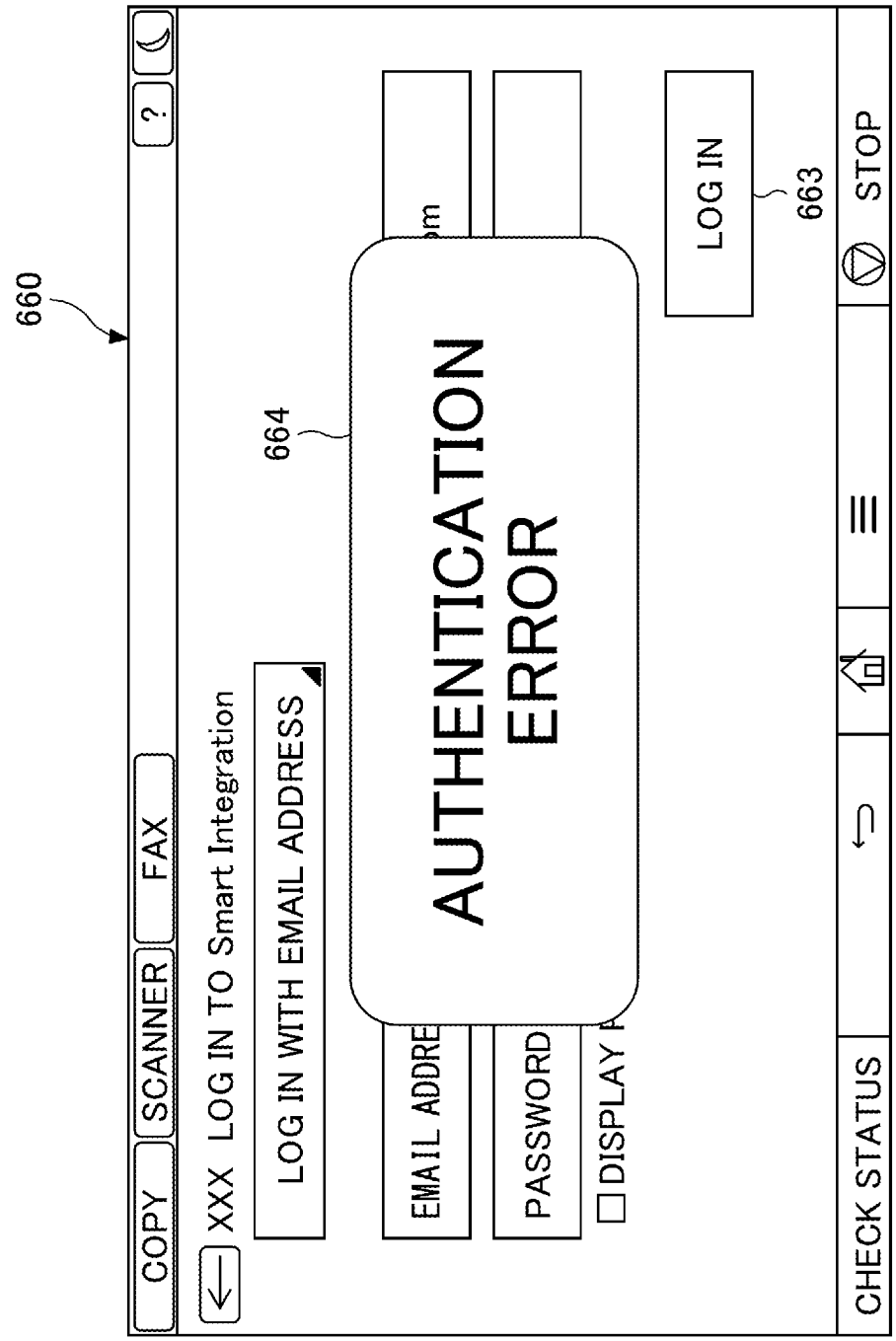

S10: First, the user logs in to the apparatus 20. An example of the authentication screen is illustrated in FIG. 12A and FIG. 12B. The user inputs the account information into the apparatus 20, and the authentication unit 26 authenticates the user based on the account information received by the operation receiver 22. The authentication unit 26 notifies the display processing unit 21 of the success or failure of the authentication. Herein, the authentication is assumed to be successful and the user name is specified. Not only the user name but also the information that specifies or identifies the user, registered in the processing method storage 13, may be specified.

S11: The apparatus 20 displays a home screen displaying, for example, a list of applications due to successful authentication. The user selects an application associated with the print workflow. An example of the home screen is illustrated in FIG. 13. When the user inputs an operation for displaying the print screen (when the application is selected), the operation receiver 22 receives the operation and notifies the display processing unit 21. The screen displayed by this application is called the print screen.

S12: The display processing unit 21 transmits a print screen acquisition request to the communicator 25.

S13: The communicator 25 transmits the print screen acquisition request to the information processing system 10. The communicator 16 of the information processing system 10 receives the print screen acquisition request.

S14: The print workflow processing unit 14 requests the print data storage 11 for the file name of the document in order to generate the screen information of the print screen. The print workflow processing unit 14 is not limited to requesting the file name, any information capable of identifying the document may be requested. The information capable of identifying the document may be acquired from the processing method storage 13. The print workflow processing unit 14 acquires a list of documents stored in the print data storage 11.

The print workflow processing unit 14 transmits the file name of the document to the apparatus 20 via the communicator 16. The print workflow processing unit 14 may simply transmit the file name of the document to the apparatus 20 and may transmit screen information for displaying the file name of the document (or a name recognized by the user such as a document name) to the apparatus 20 as a Web server. The screen information is described in such as HTML, XML, script language, cascading style sheet (CSS), and the like. The screen information is mainly analyzed and displayed by the browser software.

S15: The communicator 25 of the apparatus 20 receives the file name or screen information of the document, and transmits the print screen acquisition result (the file name or the screen information of the document) to the display processing unit 21.

Figure 14B:
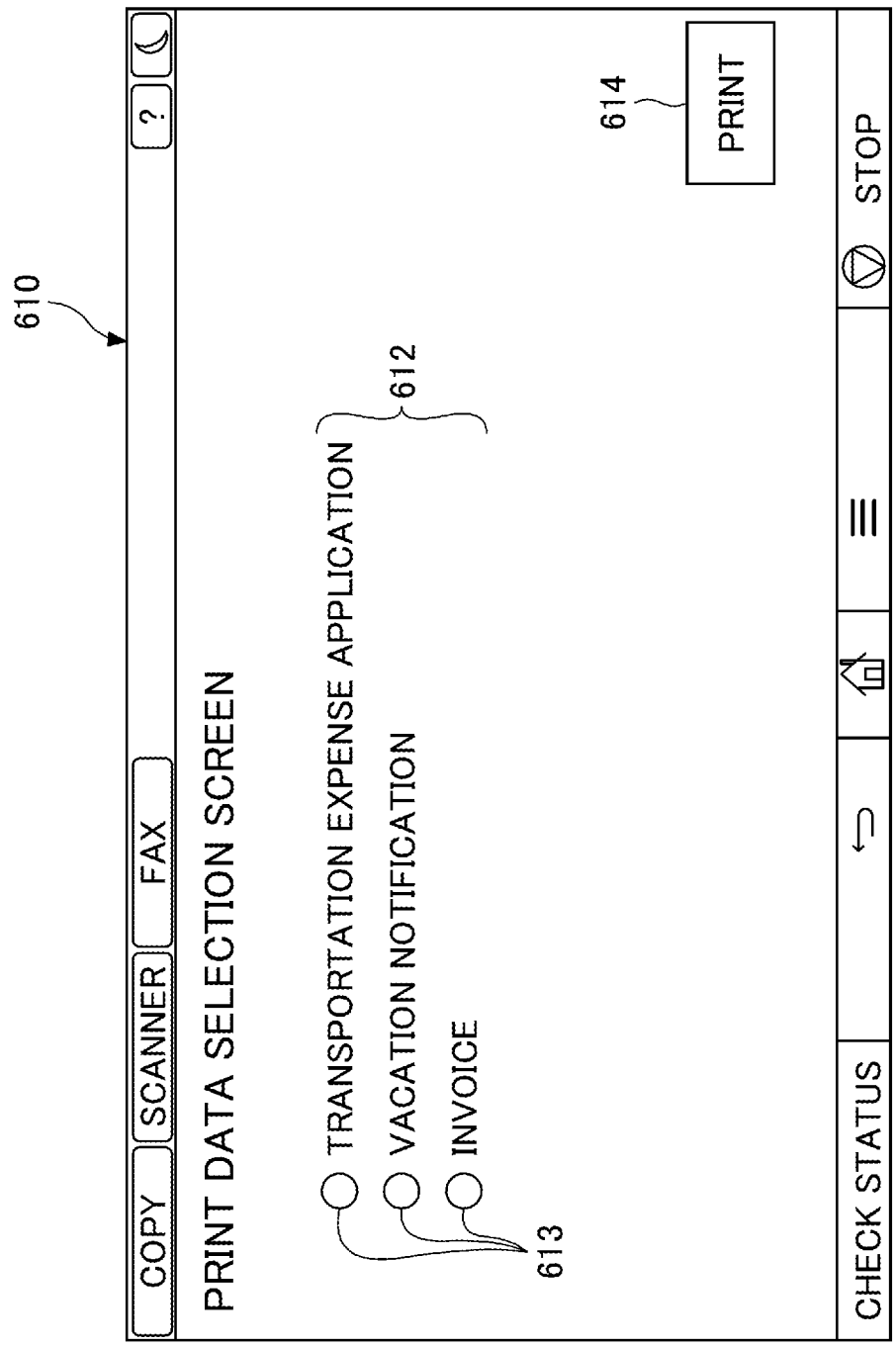

S16: The display processing unit 21 displays the print screen on the operation panel 940 based on the file name or the screen information of the document. An example of the print screen is illustrated in FIG. 14A and FIG. 14B. The user selects which document to print on the print screen. At that time, a print screen for directly displaying to select the content of the print data storage 11, as illustrated in FIG. 14A, may be used, or a print screen for selecting documents in a selective manner, as illustrated in FIG. 14B, may be used. Regardless of which screen is used, the document type is specified according to the document selected in the subsequent sequence.

S17: The user selects the document to be printed on the print screen. The operation receiver 22 receives the document type according to the selection and notifies the document type to the display processing unit 21. The document type may be any information that specifies the print data. For example, the document type may be such as a file name, an identification number in the print data storage 11, and the like. The file name and the identification number in the print data storage 11 are acquired in step S14.

Figure 15:
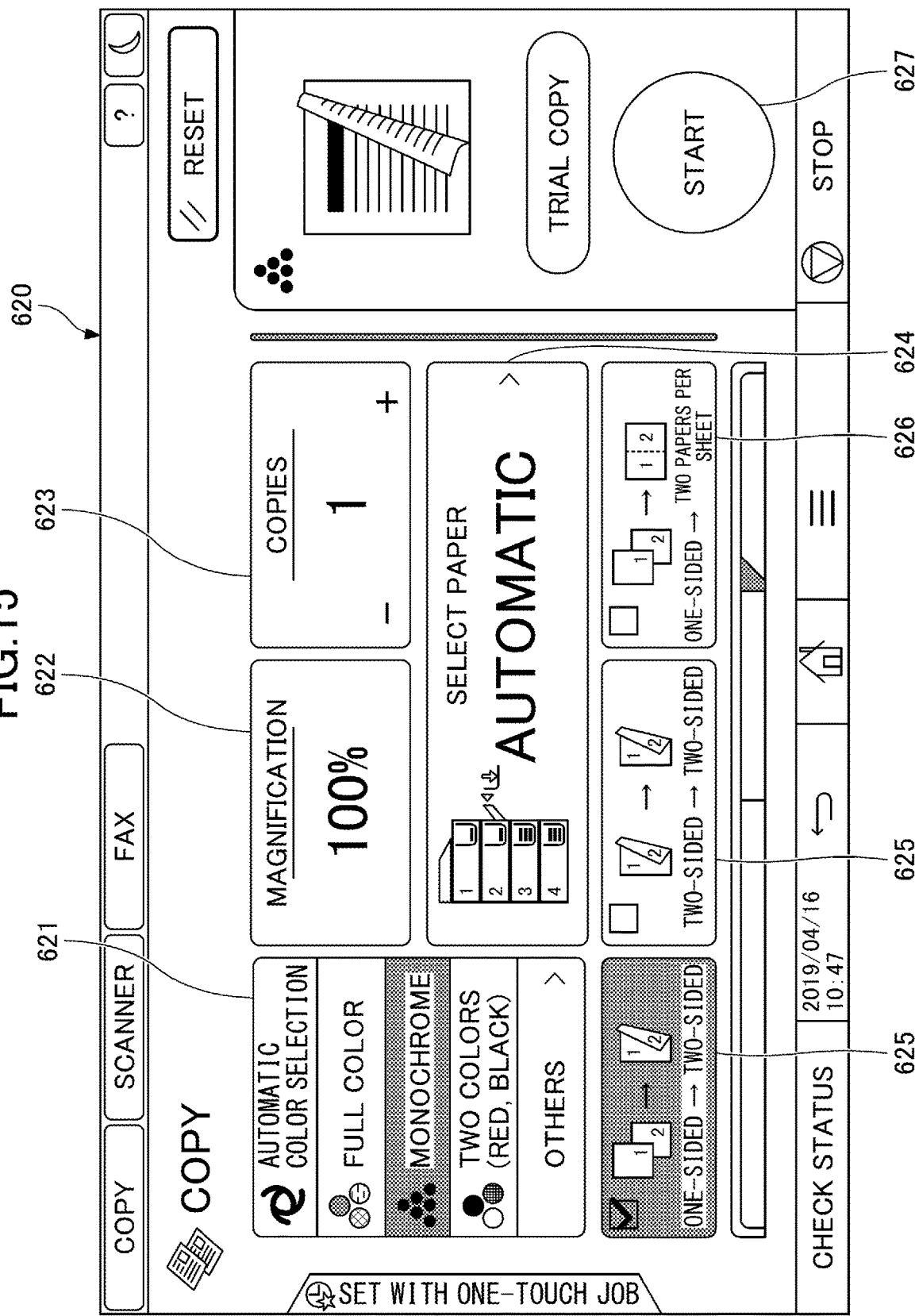
FIG. 15 is a diagram illustrating an example of a print settings screen.

When the user selects the document, the print screen transitions to the print settings screen. The user can set the print settings of the document on the print settings screen. An example of the print settings screen is illustrated in FIG. 15.

S18: The display processing unit 21 specifies the document type and the user ID specified by login, and transmits the print data acquisition request to the communicator 25.

S19: The communicator 25 of the apparatus 20 designates the document type and the user ID, and transmits the print data acquisition request to the information processing system 10. The apparatus 20 may transmit the user name. In this case, the information processing system 10 refers to a correspondence table between the user name and the user ID to convert the user name into the user ID.

S20: The communicator 16 of the information processing system 10 receives the print data acquisition request. The print workflow processing unit 14 of the information processing system 10 designates the document type and acquires the print data of the document from the print data storage 11. If the print workflow processing unit 14 includes an ID indicating the document type in the image code 9, the ID associated with the document type is acquired from the processing method storage 13.

S21: The print workflow processing unit 14 processes the print data. In other words, the document type, the user ID, and the identification information of output material are added to the print data. As a method of addition, a character string may be directly added, or an image code (image information in which specific information, such as a QR code (registered trademark), a two-dimensional code, a bar code, is embedded) may be added. Alternatively, a digital watermark, a tint block, or the like may be added. In the present embodiment, addition of the image code will be described. Details will be described with reference to FIG. 16.

S22: The print workflow processing unit 14 transmits the print data to the apparatus 20 via the communicator 16.

S23: The communicator 25 of the apparatus 20 receives the print data and returns the print data to the display processing unit 21. The text of the print data may be displayed for confirmation.

S24: The display processing unit 21 designates the print data and transmits a print request to the output unit 23.

S25: The output unit 23 executes printing.

As described above, the print workflow is executed to print the desired document to which the image code 9 including the document type, the user ID, and the identification information of output material is attached.

Example of Authentication Screen

FIG. 12A and FIG. 12B illustrate examples of the authentication screen 660. As illustrated in FIG. 12A, the authentication screen 660 includes an e-mail address field 661, a password field 662, and a login button 663. When the application document print service 601 or the simple application service 602 is pressed on a home screen 600, the screen transitions to the authentication screen 660.

The user inputs an e-mail address in the e-mail address field 661 and a password in the password field 662, and presses the login button 663. The e-mail address is one of the user's identification information. As a result, the authentication unit 26 determines the success or failure of authentication based on the account information (email address and password). If the authentication is successful, a print screen 610 or a read screen 630 is displayed. If the authentication fails, the error message 664 illustrated in FIG. 12B is displayed. In this case, the user inputs the email address and the password again.

Screen Example of Print

FIG. 13 illustrates an example of the home screen 600. The home screen 600 is a screen that serves as a starting point for user operations, and is the first screen that is displayed after startup or login. A list of several applications is displayed, one of which is an application corresponding to the print workflow and an application corresponding to the read workflow.

For example, the application document print service 601 is an application corresponding to the print workflow, and the simple application service 602 is an application corresponding to the read workflow. When the application document print service 601 is selected, the print screen 610 illustrated in FIG. 14A or FIG. 14B is displayed.

The applications for the workflows are available to users from an application market site on the operation panel 940. The added application includes a link to the Web application, and accesses the Web application created and built on the cloud by a workflow creation means.

FIG. 14A and FIG. 14B are examples of the print screen 610. FIG. 14A is a print screen 610 that directly displays the content of the print data storage 11. Therefore, a file name 611 of the document is listed. The user can select a desired document from the list. The user can select a document by pressing the file name 611.

FIG. 14B is the print screen 610 for selecting documents selectively. The print screen 610 is created by the print workflow processing unit 14 or the display processing unit 21 of the apparatus 20 from the information of the print data storage 11. The print screen 610 displays a list of documents 612. In FIG. 14B, the list of documents 612 is the same as the file name, but the name of the document recognized by the user may be displayed. In the print data storage 11, for example, if an identification number is added to each document and associated with the file name, any name of the document may be displayed in the list of documents 612. The user can select a document by pressing a radio button 613.

When a print button 614 is pressed in FIG. 14A or FIG. 14B, the display processing unit 21 displays the print settings screen.

FIG. 15 illustrates an example of print settings screen 620. The print setting screen 620 is a screen for setting parameters such as color/monochrome 621, the magnification 622, the number of copies 623, the paper 624, two-sided/one-sided 625, papers per sheet 626, and the like. When the user presses the start button 627, the printing of the selected document starts (steps S18 and subsequent steps are processed).

<Information Included in Image Code>

FIG. 16 is a diagram for illustrating information included in the image code 9. In FIG. 16, ":" (half-width colon) is a delimiter. Therefore, FIG. 16 includes four pieces of information: @EDW\n (101), transportation expense application.pdf (102), user0001 (103), and 20200624091020 (104). The first piece of information, @EDW\n (101) is a service identification character string. The service identification character string indicates that the image code is assigned by the present application (Web application provided by the information processing system). The service identification character string is fixed regardless of the document, for example, "@EDW". Note that \n is a line feed code. For example, when multiple image codes are attached on a paper printed by the apparatus 20, the information processing system 10 can specify the image code 9 including the service identification character string. The service identification character string is not limited to "@EDW" as long as the information processing system 10 can specify the image code. The second piece of information, the transportation expense application.pdf (102) is the file name of the document. In the present embodiment, since a unique file name is given, the file name is a document type. The maximum document type is up to 50 characters including the extension, and excess is rounded down. The third piece of information, user0001 (103) is the user ID of the logged-in user. That is, the account of the user who executed the print workflow. The maximum is up to 50 characters, and excess is rounded down. The fourth piece of information, 20200624091020 (104) is the date and time when the apparatus 20 printed the document including the image code 9. JST (Japan Standard Time) is expressed in yyyyMMddHHmmss format. In the present embodiment, the date and time are used as the identification information of output material. As long as the uniqueness of the output material can be guaranteed, the identification information of output material may be an execution date and time of the print workflow, generation date and time of the image code 9, a date and time when the apparatus 20 accesses the information processing system 10, and the like.

Example of Filling in Document

Figure 17:
FIG. 17 is a diagram illustrating an example of a document printed by the apparatus.

FIG. 17 illustrates an example of a document printed by the apparatus 20. The document of FIG. 17 is an example of a vacation notification, but any document may be used. FIG. 17(a) is a vacation notification before the image code 9 is added, and FIG. 17(b) is a vacation notification on which the image code 9 is attached. The user fills in the required item and executes the read workflow.

In FIG. 17(b), the image code 9 is attached in the upper right of the vacation notification. The image code 9 is encoded with @EDW, the document type (for example, vacation notification.pdf), the user ID, and the identification information of output material.

Figure 18B:
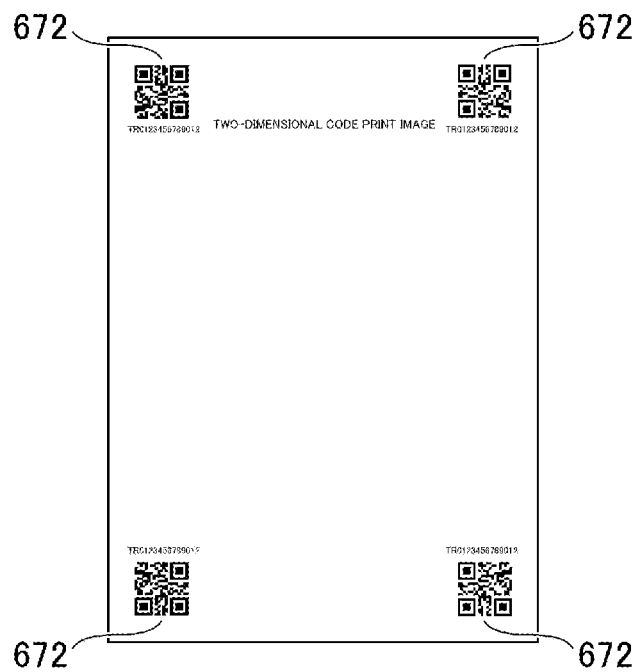

As illustrated in FIG. 18A and FIG. 18B, an attachment position of the image code 9 can be set by the administrator in the workflow setting. FIG. 18A is an example of a position setting screen 670 displayed by the first terminal device 50 operated by the administrator.

The position setting screen 670 includes a print position item 671. The print position item 671 includes a pull-down menu that displays upper left, upper right, lower left, or lower right. The administrator can set the attachment position of the image code 9 from any of the upper left, upper right, lower left, or lower right. If desired, the administrator may be able to set two or more locations. FIG. 18B schematically illustrates the attachment position. The image code 9 is attached at one or more of the four formation positions 672 illustrated in FIG. 18B selected by the administrator.

<Read Workflow>

Next, a case where the user executes the read workflow will be described. In the read workflow, the administrator can set whether to prohibit duplicate documents in the information processing system 10. This is because applications using the same document may be accepted depending on the document handled by the user. For example, the use of a duplicate document in settling travel expenses may be prohibited, but the use of a duplicate document in a business report may be allowed. Therefore, the user may apply by using the same document. As a result, the effort and cost of printing the document, each time being reported by user may be saved. Therefore, in the present embodiment, the administrator can set whether to prohibit duplicate documents in the information processing system 10.

<<Setting for Prohibiting Duplicate Documents>>

FIG. 19 is an example of the duplicate document setting screen 680 displayed by the first terminal device 50 being operated by the administrator. The duplicate document setting screen 680 includes a duplicate document prevention item 681. The duplicate document prevention item 681 includes a pull-down menu for displaying "Yes" or "No". The administrator can select either "Yes" or "No" for each document type.

When the information processing system 10 is set to prohibit duplicate documents, the information processing system 10 uses the identification information of output material (print date and time) included in the image code 9 as the file name of the image data (input data). Since files having the same file name are not allowed to be saved in one folder, duplicate detection becomes available automatically. If files having the same file name exist in the storage destination folder, the information processing system 10 returns an error to the apparatus 20, the user, or both (sending an email).

When the setting for prohibiting duplicate documents is not set, the information processing system 10 uses the scan date and time as the file name of the image data (input data) instead of the identification information of output material (print date and time) included in the image code. Even if the application documents are the same, since the file name changes each time the scan date and time changes, the duplicate file cannot practically be detected.

As described above, the information processing system 10 of the present embodiment changes the file name given to the image data from the information processing system 10 depending on whether the setting for prohibiting duplicate documents is set.

FIG. 29 illustrates an example of a duplicate detection setting information in which the presence/absence of the setting for prohibiting duplicate documents being set by the administrator is registered. Whether the setting for prohibiting duplicate documents is set for each document type is set in the duplicate detection setting information. The duplicate detection setting information is stored in, for example, the external system 30. The duplicate detection setting information may be stored in the information processing system 10.

FIG. 20 is a diagram illustrating a file name given to the image data by the information processing system 10. FIG. 20(*a*) illustrates a file name assignment rule when the setting for prohibiting duplicate documents is set. According to the file name assignment rule, a "prefix (111)", a "user ID (112)", and a "print date and time (113)" are each enclosed in { }, and each is separated by "_". "Pdf" is an extension. The extension may be other than pdf.

The prefix (111) is a document type.

The user ID (112) is a user ID (identification information of the user who printed the document) included in the image code 9.

The print date and time (113) is the identification information (print date and time (yyyyMMddHHmmss)) of the output material included in the image code 9.

Therefore, with all of the above being included in the image code 9, the information processing system 10 can use these to give a file name to the image data (input data). Since the identification information of output material is unique, the duplicate detector 19 can detect duplication of image data. Since the file name also includes the user ID, uniqueness may be more easily maintained.

FIG. 20(*b*) illustrates a file name assignment rule when the setting for prohibiting duplicate documents is not set. The "prefix (111)" and the "user ID (112)" are the same as in FIG. 20(*a*). When the setting for prohibiting duplicate documents is not set, the scan date and time (114) is included in the file name instead of the identification information of output material.

The scan date and time (114) is the date and time when the read workflow is executed by the user (yyyyMMddHHmmss). The scan date and time (114) may be any information related to the date and time when the service is provided. For example, the scan date and time (114) may be the date and time when the information processing system 10 receives the service request from the apparatus 20, or the date and time when the image data is received from the apparatus 20.

Because the scan date and time change with each scan, the possibility of the same file name existing in one folder may be eliminated. Even if files having the same scan date and time exist, it is unlikely that the user ID is the same, so the information processing system 10 can store the image data in one folder (without the setting for prohibiting duplicate documents). Therefore, the scan date and time may be a random character string having a number of digits that can be considered to be unlikely to be duplicated.

<Process of Read Workflow>

Figure 21:
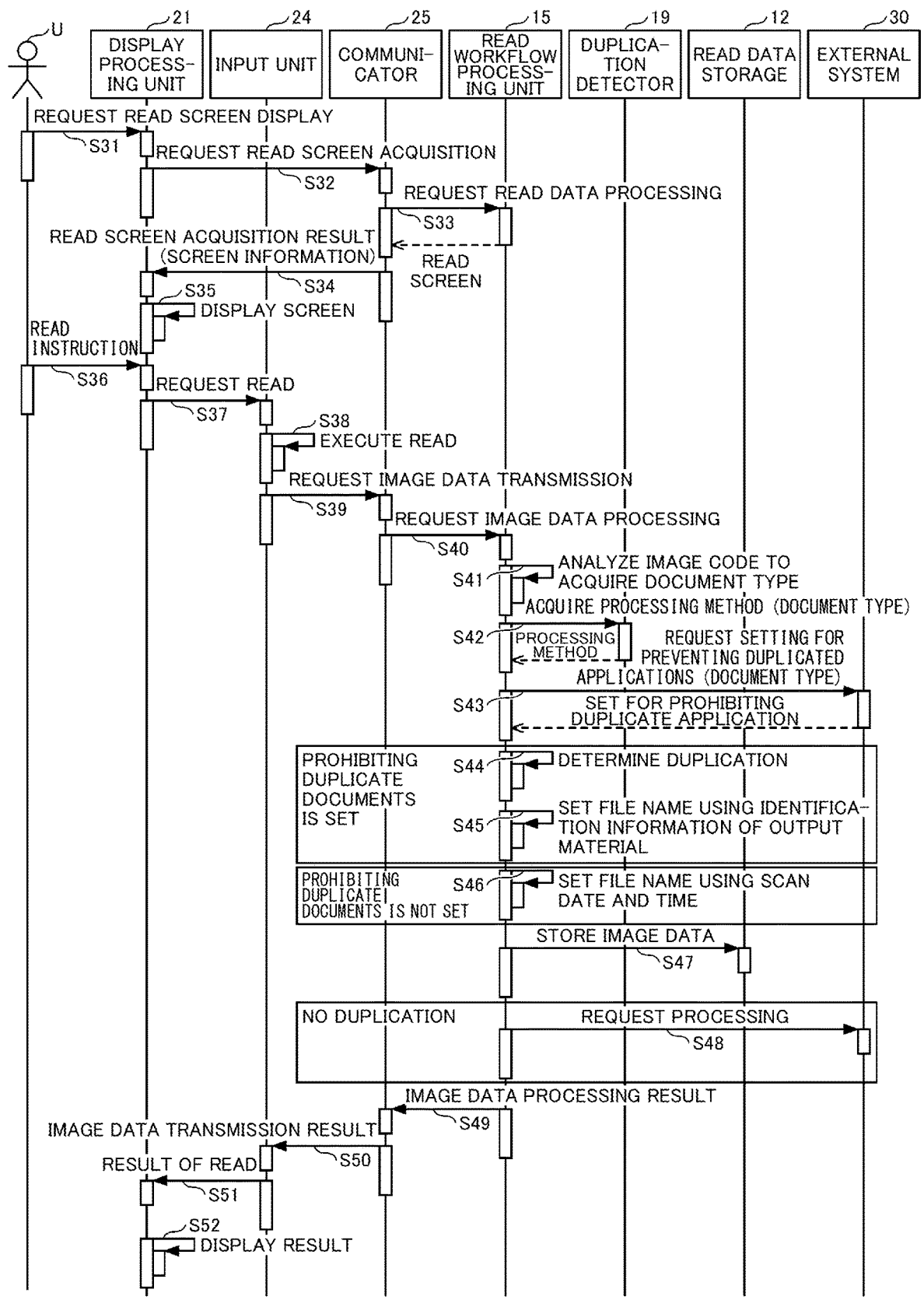
FIG. 21 is an example of a sequence diagram illustrating a process executed by the information processing system in a read workflow.

FIG. 21 is an example of a sequence diagram illustrating a process executed by the process executing system 1 in the read workflow. Note that the user is assumed to be logged in already to the apparatus 20.

S31: The home screen 600 is displayed by the user, and the user selects the application (the simple application service 602) associated with the read workflow. The screen displayed by the application is the read screen. When the user inputs an operation for displaying the read screen (pressing the simple application service 602), the operation receiver 22 receives the operation to notify the display processing unit 21.

S32: The display processing unit 21 transmits a read screen acquisition request to the communicator 25.

S33: The communicator 25 transmits the read screen acquisition request to the information processing system 10. The communicator 16 of the information processing system 10 receives the read screen acquisition request. The read workflow processing unit 15 transmits the screen information of the read screen to the apparatus 20. The read screen may be a fixed screen that displays a predetermined message.

S34: The communicator 25 of the apparatus 20 transmits the received screen information of the read screen to the display processing unit 21.

Figure 22:
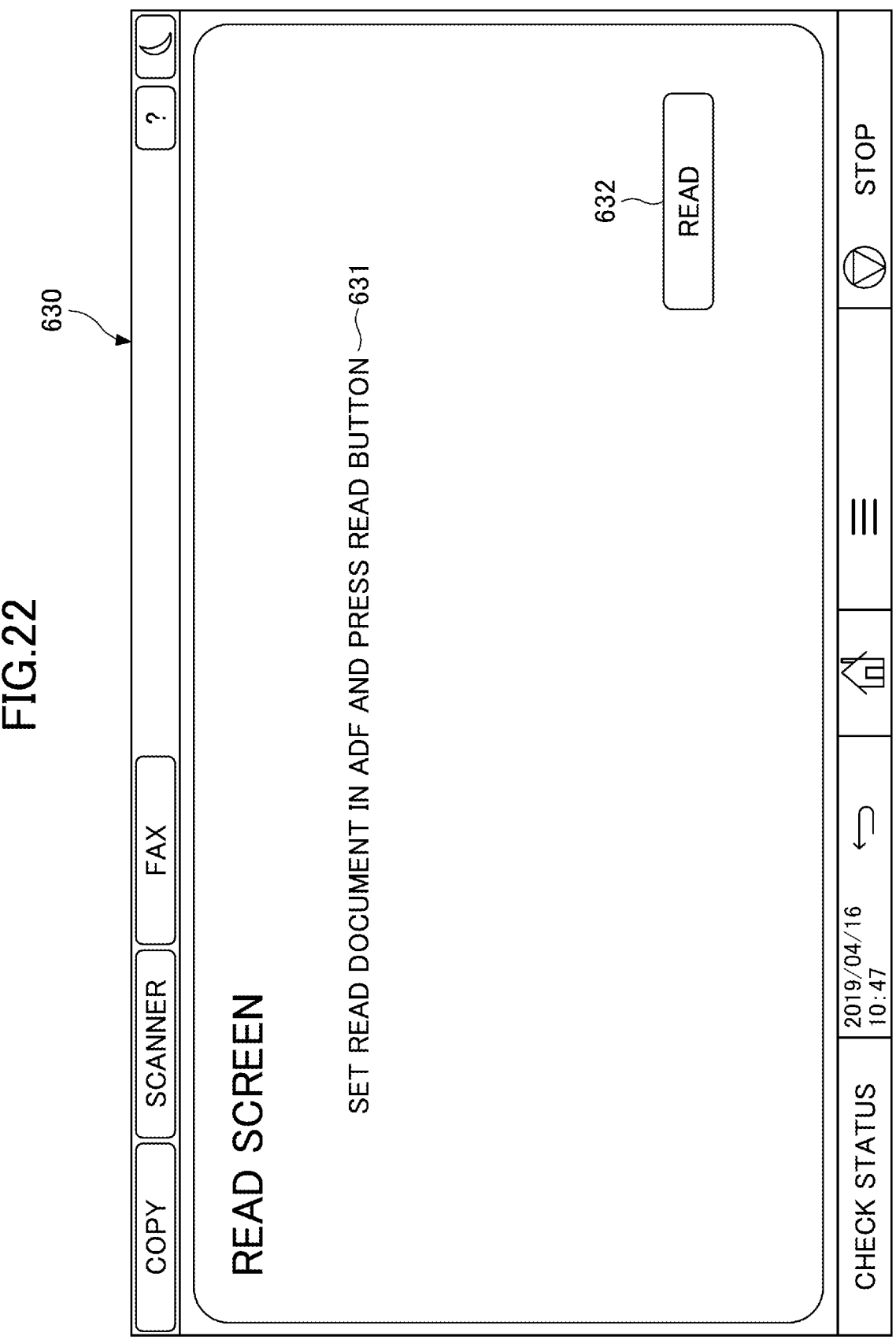
FIG. 22 is a diagram illustrating an example of a read screen.

S35: The display processing unit 21 displays the read screen on the operation panel 940 based on the screen information of the read screen. An example of the read screen is illustrated in FIG. 22.

S36: The user sets the document in the ADF or the like referring to the read screen, and inputs the read instruction of the entered document to the apparatus 20. The operation receiver 22 receives the read instruction.

Figure 23:
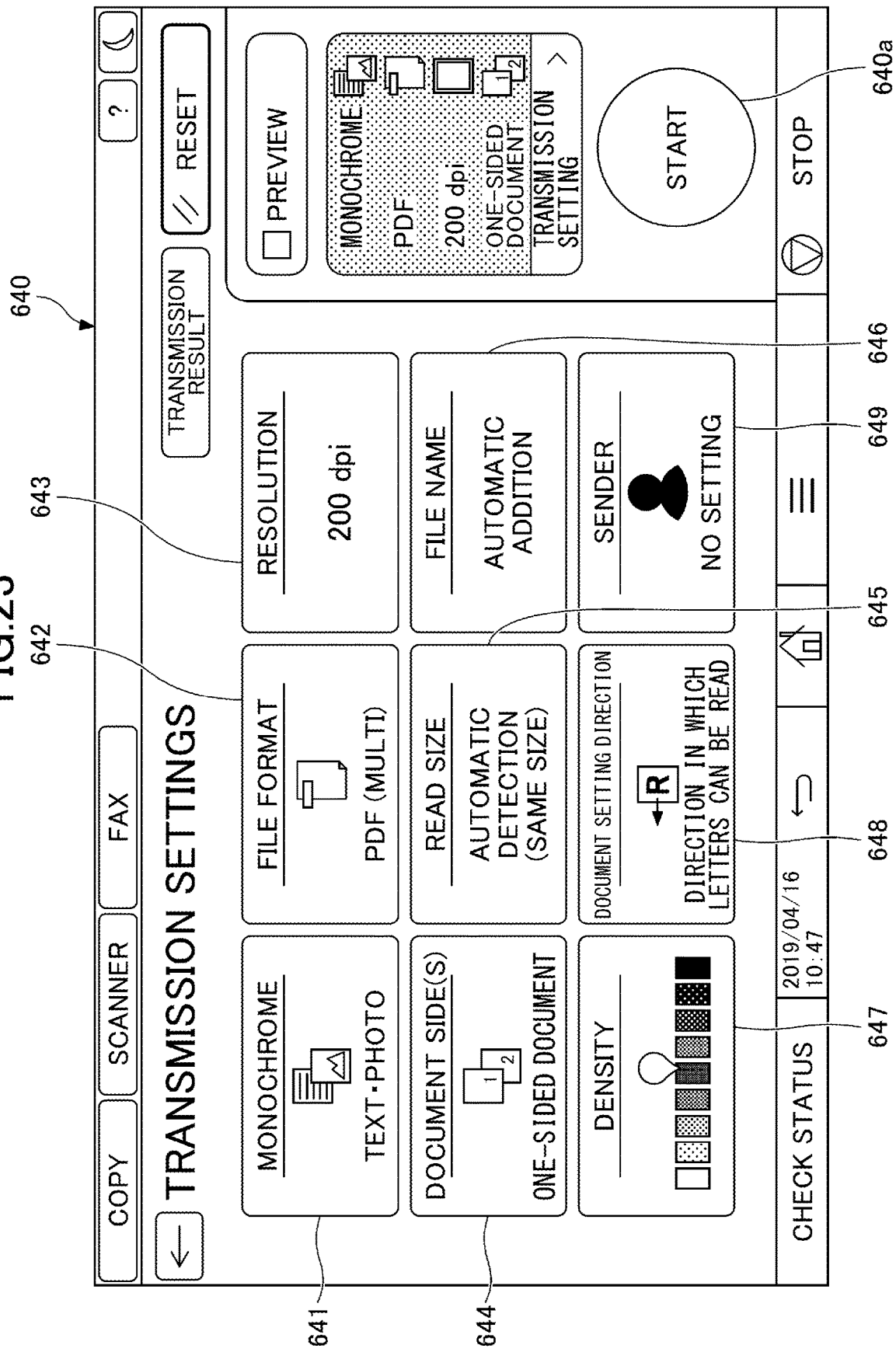
FIG. 23 is a diagram illustrating an example of a reading settings/execution screen.

When the user inputs the read instruction, the read screen transition to a reading settings/execution screen. The user can set a read condition on the reading settings/execution screen. FIG. 23 illustrates an example of the reading settings/execution screen.

S37: The display processing unit 21 designates the read condition to transmit a read request to the input unit 24.

S38: The input unit 24 reads the document according to the read conditions. As a result, image data of the document is generated.

S39: The input unit 24 transmits a transmission request for the image data to the communicator 25.

S40: The communicator 25 of the apparatus 20 transmits the image data to the information processing system 10.

S41: The communicator 16 of the information processing system 10 receives the image data, and the read workflow processing unit 15 detects the image code and, if the image code exists, analyzes (decodes) the image code. As a result, the document type, the user ID, and the identification information of output material are restored.

S42: The read workflow processing unit 15 designates the document type to acquire the processing method information from the processing method storage 13. Herein, the processing method may be acquired. When the document type read from the image code is the "vacation notification", the processing method is that the data storage destination is under "/kyuuka folder" and the notification destination is "ccc@bb.cc".

S43: Next, the read workflow processing unit 15 designates the document type from the external system 30 to acquire the setting for prohibiting duplicate documents. By designating the document type (or ID), the presence/absence of the setting for prohibiting duplicate documents is acquired from the external system 30.

If the setting for prohibiting duplicate documents is set, the duplicate detector 19 determines duplication of image data based on the information included in the image code. That is, as illustrated in FIG. 16, the duplicate detector 19 determines whether the identification information of output material included in the image code is stored in the identification information of output material storage 8. Note that the determination may be made using both the identification information of output material and the user ID. Further, when the read workflow processing unit 15 stores the image data in the folder, the duplication of the image data can be detected by the file name. Therefore, the determination of duplication in step S44 is not required necessarily.

Figure 25:
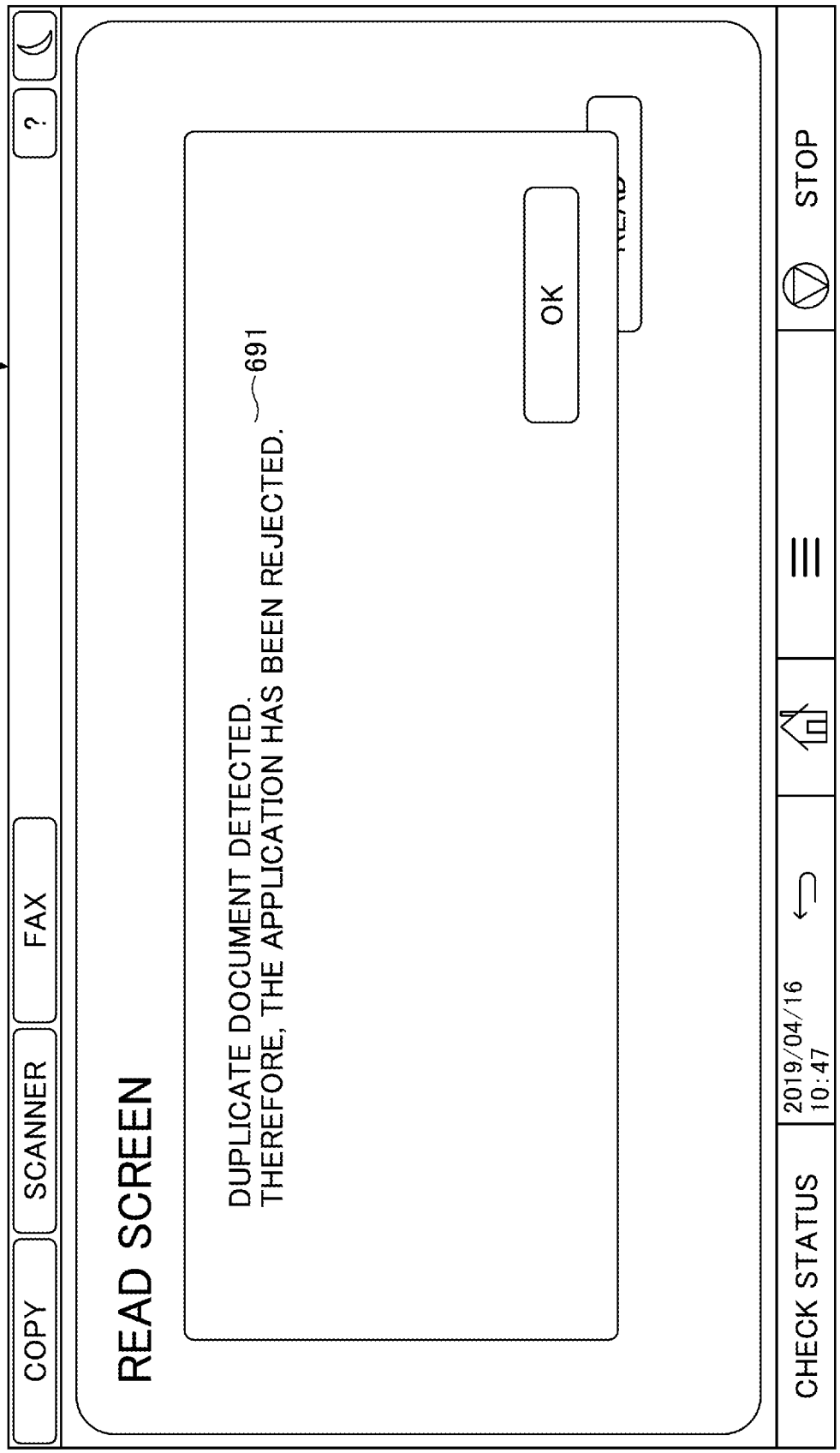
FIG. 25 is a diagram illustrating an example of a reading/processing result screen displayed by the apparatus when a duplicate document is detected.

S45: Next, a file name setting section 15*a* sets the file name using the identification information of output material. This is because the read workflow processing unit 15 detects an error when a file having the same file name already exists in the folder. Therefore, when step S44 is executed, the information processing system 10 can prohibit duplicate documents in two ways. The method of determining whether a file having the same file name already exists in the folder of the read data storage 12 may be a method in which the read workflow processing unit 15 compares a newly set file name with a list of file names in a folder. Alternatively, a method in which the OS outputs an error when the read workflow processing unit 15 writes a file to the folder may be considered. FIG. 25 illustrates an example of a reading/processing result screen when the duplicate document is detected.

S46: If the setting for prohibiting duplicate documents is not set, the file name setting section 15*a* sets the file name using the scan date and time. As a result, the possibility of the same file name existing in the folder may be eliminated. The user ID used for the file name may be a user ID specified by the user logging in when executing the read workflow.

S47: The read workflow processing unit 15 stores the image data in the folder being set in the processing method storage 13. In FIG. 21, the folder is assumed to be in the read data storage 12. If the file having the same file name is stored in the folder, the read workflow processing unit 15 does not store the file in the folder according to the document type. If the file having the same file name is not stored in the folder, the read workflow processing unit 15 stores the file in the folder according to the document type. If the setting for prohibiting duplicate documents is set, an error occurs when the file names match, so the information processing system 10 can prohibit duplicate documents.

S48: When the duplicate detector 19 determines that there is no duplication, the read workflow processing unit 15 transmits the image data to the external system set in the processing method storage 13 to request a process according to the external system. In the case of the processing method storage 13 in FIG. 26, an email notification is sent to "ccc@bb.cc." In addition, a cooperation process may be requested to other external systems. As described above, even in the process in which the duplicate document is not able to be prohibited by the matching of the file names, the duplicate detector 19 determines the duplicate document (duplicated image data) so that the duplicate document based on the same document can be prohibited.

S49: The read workflow processing unit 15 transmits the processing result to the apparatus 20. The processing result includes, when the setting for prohibiting duplicate documents is set, the case where duplication of image data is detected.

S50: The communicator 25 of the apparatus 20 receives the processing result and transmits the processing result to the input unit 24.

S51: The input unit 24 transmits the processing result to the display processing unit 21.

Figure 24:
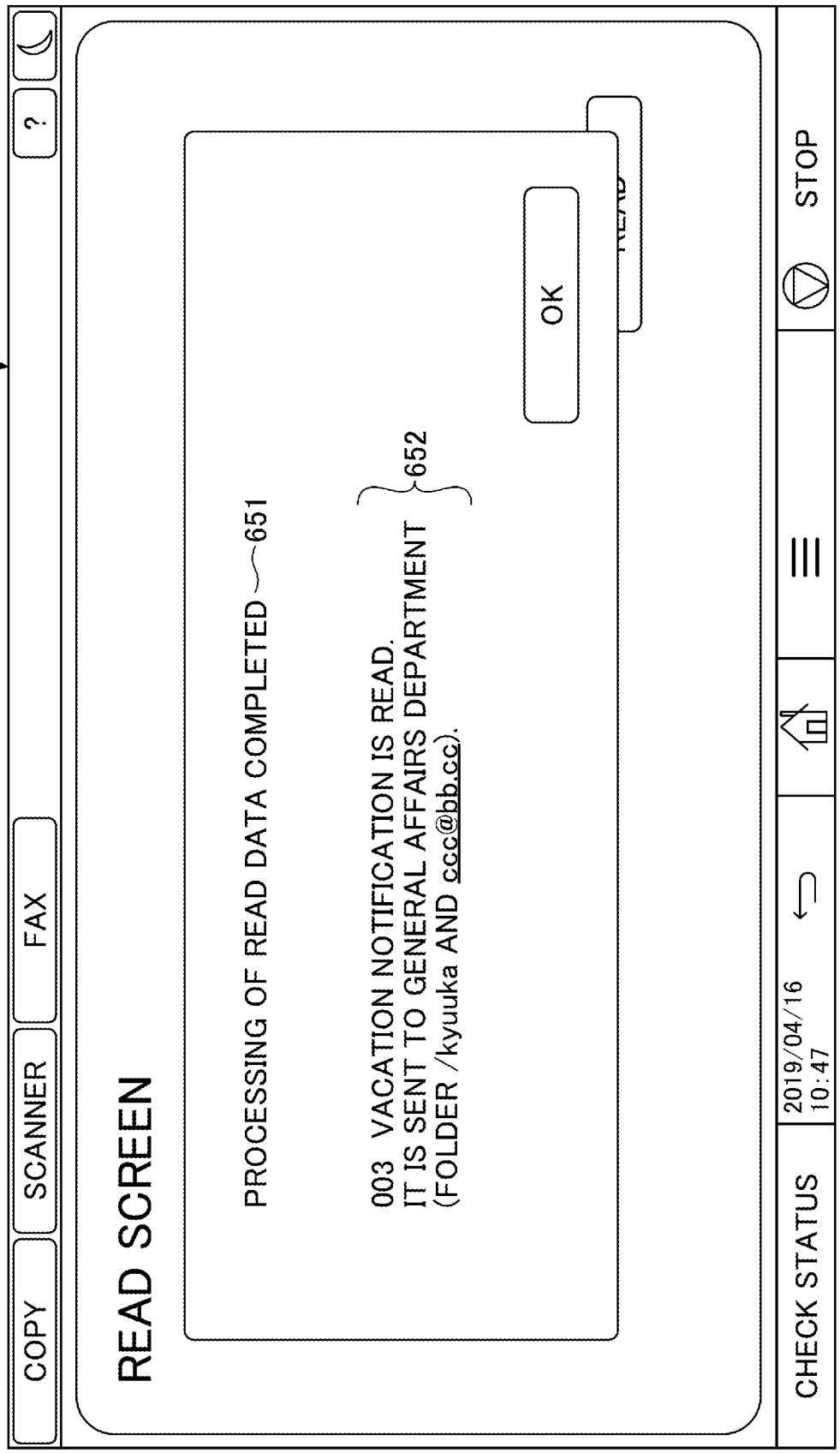
FIG. 24 is a diagram illustrating an example of a reading/processing result screen.

S52: The display processing unit 21 displays a reading/processing result screen including the processing result on the operation panel 940. FIG. 24 illustrates an example of the reading/processing result screen.

As described above, the read workflow is executed, and the document is sent to a folder determined according to the document type or is processed by the external system.

Screen Example of Read

FIG. 22 is an example of the read screen 630. A transition to the read screen 630 of FIG. 22 occurs when the simple application service 602 is selected on the home screen of FIG. 13. The read screen 630 includes a message 631 "Set read document in ADF and press read button", and a read button 632. By pressing the read button 632, the read screen 630 transitions to the reading settings/execution screen 640.

FIG. 23 is an example of the reading settings/execution screen 640. A monochrome 641, a file format 642, a resolution 643, a document side 644, a read size 645, a file name 646, a density 647, a document setting direction 648, and a sender 649 can be set on the reading settings/execution screen 640. When a start button 640*a* is pressed, reading is started (steps S37 and subsequent steps are processed). When the reading is completed, the screen transitions to the reading/processing result screen 650.

FIG. 24 is an example of the reading/processing result screen 650 displayed by the apparatus when the execution is completed. The reading/processing result screen 650 displays a message 651 "Processing of read data completed" and a processing method 652 in which the image data is processed based on the document type ID and the processing method information. The processing method 652 is, for example, "003 vacation notification is read, and is sent to general affairs department (/kyuuka folder and ccc@bb.cc)". "003" is a document type ID. Further, information such as the "general affairs department" is assumed to be preset in the processing method storage 13.

FIG. 25 is an example of the reading/processing result screen 690 displayed by the apparatus when the duplicate document is detected. The message 691 "Duplicate document detected. Therefore, the application has been rejected." is displayed on the reading/processing result screen 690. The user is able to understand that an error has occurred by reading the message, and to take measures such as printing a new document. The information processing system 10 may send an e-mail with a similar message to a logged-in user. Both of the displaying the reading/processing result screen 690 of FIG. 25 and the sending of e-mail may be performed.

<Main Effect>

As described above, the information processing system 10 of the present embodiment can detect duplicate documents based on the identification information of output material. Therefore, it is possible to prevent employees from filing duplicate documents such as expenses. Further, because the administrator can set the presence/absence of the setting for prohibiting duplicate documents for each document, the information processing system 10 can switch whether to detect the duplicate document for each document.

Other Application Examples

Although the best way for implementing the present disclosure has been described above with reference to embodiments, the present disclosure is not limited to above-described examples, and various modifications and substitutions may be made without departing from the scope of the present disclosure. A process that combines each embodiment may be executed.

Further, in the present embodiment, the image forming apparatus is mainly used as the apparatus 20 for an explanation, but the present disclosure is not limited to an image forming apparatus. The apparatus 20 may be, for example, a projector (PJ), an Interactive White Board (IWB: a whiteboard with an electronic blackboard function available for mutual communication), an output device such as digital signage, a Head-Up Display (HUD) device, industrial machinery, an imaging device, a sound collector, medical equipment, network appliances, a Connected Car, a laptop, a mobile phone, a smartphone, a tablet, a game console, a Personal Digital Assistant (PDA), a digital camera, a wearable PC, a desktop PC, and the like.

Further, the configuration example such as illustrated in FIG. 5 is divided according to the main functions to facilitate understanding of the process by the information processing system 10. The present disclosure is not limited is neither defined by nor limited to the divisions the processing unit or the name. The process of the information processing system 10 may be divided into more processing units according to the process content. Further, a single processing unit may be divided so as to include more processes.

Further, the device group described in the embodiments is only one of a plurality of computing environments for implementing the embodiments disclosed in the present specification. The information processing system 10 may include a plurality of computing devices, such as a server cluster. The plurality of computing devices are configured to communicate with each other via any type of communication link, including a network, a shared memory, and to perform the processes disclosed herein.

Further, the information processing system 10 can be configured to share the disclosed process steps, for example, FIG. 11, FIG. 21, and the like in various combinations. For example, a process executed by a predetermined unit can be executed by a plurality of information processing devices included in the information processing system 10. Further, the information processing system 10 may be integrated into a single server device or may be distributed across a plurality of devices.

Further, each of the functions of the above-described embodiment may be implemented by one or more processing circuits or circuitry. As used herein, the "processing circuit" includes a processor programmed to perform each function by software, such as a processor implemented in electronic circuits, an application specific integrated circuit (ASIC) designed to perform each function as described above, a digital signal processor (DSP), a field programmable gate array (FPGA), or a conventional circuit module.

What is claimed is:

1. A process executing system that receives image data of an output material from an apparatus and processes the output material, the process executing system comprising:
one or more memories; and
one or more processing circuits coupled to the one or more memories and configured to function as:
a communicator configured to transmit, to the apparatus, output data of the output material including identification information of the output material and identification information of a user operating the apparatus, and configured to receive image data generated by reading the output material by the apparatus, the output material being the output data printed by the apparatus; and
a duplication detector configured to detect a generation of the image data from a same output material as the output material, based on the identification information of the output material and the identification information of the user attached in the image data received by the communicator.

2. The process executing system according to claim 1, wherein the communicator further transmits output data of the output material including a type of the output material to the apparatus, and receives the image data, and
wherein the communicator performs a process according to the type of the output material.

3. The process executing system according to claim 2, wherein the duplication detector refers to duplication detection setting information, corresponding to the type of the output material, that indicates whether to detect a generation of the image data from the same output material as the output material, and
wherein the duplication detector detects a generation of the image data from the same output material as the output material in a case where the duplication detection setting information is set to detect the generation of the image data from the same output material as the output material.

4. The process executing system according to claim 3, further comprising a file name setting section and a read workflow processor,
wherein the file name setting section is configured to, when the duplication detection setting information is set to detect the generation of the image data from the same output material as the output material, set a file name that includes identification information of the output material for a file of the image data,
wherein, when a file having a same file name is already stored in a folder according to the type of the output material, the read workflow processor is configured not to store the file of the image data in the folder, and
wherein, when a file having the same file name is not stored in the folder, the read workflow processor is configured to store the file of the image data in the folder.

5. The process executing system according to claim 3, further comprising a file name setting section and a read workflow processor,
wherein the file name setting section is configured to, when the duplication detection setting information is not set to detect the generation of the image data from the same output material as the output material, set a file name that includes date and time information related to reception date and time of the image data for the file of the image data,
wherein, when a file having a same file name is already stored, in a folder according to the type of the output material, the read workflow processor is configured not to store the image data file in the folder, and
wherein, when a file having the same file name is not stored in the folder, the read workflow processor is configured to store the image data file in the folder.

6. The process executing system according to claim 1, wherein at least one of the apparatus and the user operating the apparatus is notified of an error, when the duplication detector detects the generation of the image data from the same output material as the output material.

7. The process executing system according to claim 1, wherein
the identification information of the output material includes:
a date and time of transmission of the output data of the output material to the apparatus; a date and time of reception of the request from the apparatus;

or a date and time of start of communication with the apparatus, and the output data of the output material further includes a type of the output material.

8. An information processing method performed by a process executing system that receives image data of an output material from an apparatus and processes the output material, the method comprising:

a step of transmitting, by a communicator, to the apparatus, output data of the output material including identification information of the output material and identification information of a user operating the apparatus;

a step of receiving, by the communicator, image data generated by reading the output material by the apparatus, the output material being the output data printed by the apparatus; and step of detecting, by a duplication detector, a generation of the image data from a same output material as the output material, based on the identification information of the output material and the identification information of the user attached in the image data received by the communicator.

9. A non-transitory recording medium storing a program to cause an information processing system to function as:

a communicator configured to transmit, to the apparatus, output data of the output material including identification information of the output material and identification information of a user operating the apparatus, the communicator configured to receive image data generated by reading the output material by the apparatus, the output material being the output data printed by the apparatus; and a duplication detector configured to detect a generation of the image data from a same output material as the output material, based on the identification information of the output material and the identification information of the user attached in the image data received by the communicator.

* * * * *